Aug. 29, 1961 C. E. LOMAX 2,998,492

INTER-OFFICE TRUNKING PLAN

Filed Dec. 11, 1958

9 Sheets-Sheet 1

INVENTOR.
CLARENCE E. LOMAX

BY C. A. Gulbrandsen

ATTY.

Aug. 29, 1961 C. E. LOMAX 2,998,492

INTER-OFFICE TRUNKING PLAN

Filed Dec. 11, 1958 9 Sheets-Sheet 2

INVENTOR.
CLARENCE E. LOMAX
BY
C. A. Gullbrandson
ATTY.

COMBINATION 1ST & 2ND SELECTOR 300

INVENTOR.
CLARENCE E. LOMAX
BY
C. A. Gulbrandsen
ATTY

COMBINATION 3RD & 4TH SELECTOR 400

INVENTOR.
CLARENCE E. LOMAX
BY C. A. Gulbrandsen
ATTY.

3RD & 4TH SELECTOR 500

INVENTOR.
CLARENCE E. LOMAX
BY C. A. Gulbrandsen
ATTY.

Aug. 29, 1961 C. E. LOMAX 2,998,492

INTER-OFFICE TRUNKING PLAN

Filed Dec. 11, 1958 9 Sheets-Sheet 6

INVENTOR.
CLARENCE E. LOMAX
BY
C. A. Gullbrandsen
ATTY.

Aug. 29, 1961 C. E. LOMAX 2,998,492

INTER-OFFICE TRUNKING PLAN

Filed Dec. 11, 1958 9 Sheets-Sheet 7

3RD SELECTOR 700

INVENTOR.
CLARENCE E. LOMAX
BY
C. A. Gulbrandsen
ATTY.

INVENTOR.
CLARENCE E. LOMAX
BY C. A. Gulbrandsen
ATTY.

Aug. 29, 1961 C. E. LOMAX 2,998,492

INTER-OFFICE TRUNKING PLAN

Filed Dec. 11, 1958 9 Sheets-Sheet 9

INVENTOR.
CLARENCE E. LOMAX

BY C. A. Gulbrandsen

ATTY.

2,998,492

INTER-OFFICE TRUNKING PLAN

Clarence E. Lomax, Hastings, Nebr., assignor to Automatic Electric Laboratories, Inc., a corporation of Delaware Filed Dec. 11, 1958, Ser. No. 779,614
27 Claims. (Cl. 179—18)

This invention relates in general to a telephone system, and more particularly to an inter-office trunking plan using drop-back selectors and bi-level repeaters in a seven digit system.

It is an object of this invention to provide improved drop-back selectors which absorb dialled digits if dialled in a certain sequence, while still utilizing every level of bank contacts for extending connections over trunk lines terminating therein.

It is another object of the invention to provide improved circuit arrangements in a combination first and second drop-back selector which blocks first digit calls to levels used only as second selector levels, and which blocks second digit calls to levels used only as first selector levels, thereby blocking calls when an incorrect first or second digit is erroneously dialled by causing the selector to rotate to the overflow position to give the busy tone.

It is another object of the invention to provide improved circuit arrangements in a combination first, second and third drop-back selector which blocks first digit calls to levels used only as second or third selector levels, and which block second digit calls to levels used only as first and third selector levels, thereby blocking calls when an incorrect first, second, or third digit is erroneously dialled by causing the selector to rotate to the overflow position and give a busy signal.

It is another object of this invention to provide a second rank of selectors used as combination third and fourth selectors which are seized by bi-level repeaters from other suboffices, to block certain trunk levels therein dependent upon the path the bi-level repeaters are seized over.

It is another object in conjunction with the above-described combination third and fourth selectors to permit said selectors to respond as third and fourth selectors when seized over one path by said bi-level repeaters, and permit said selectors to respond only as third selectors when seized over a second path by said bi-level repeaters.

A feature of the invention resides in the utilization of a plurality of sets of cam operated springs and a vertical bank in a combination first, second and third drop-back selector, whereby each set of cam springs when operated controls the connection of ground to different bank contacts on said vertical bank necessitating the receipt of a dialled digit corresponding to a grounded bank contact to permit said switch to cut-through to a succeeding switch.

Another feature of the invention in combination with the above feature, resides in the inclusion of digit absorbing means controlled by said cam springs to initiate sequential operation and restoration of different sets of cam springs responsive to each absorption of a digit to sequentially place ground on different bank contacts on said vertical bank.

Another feature of the invention in combination with the above features, resides in the inclusion of a pair of normal post springs which operate separately on predetermined levels of bank contacts, whereby the operation of one predetermined set of cam springs and one predetermined set of normal post springs at one time permits the initiation of said digit absorbing, to enable every level of bank contacts to be utilized for seizing succeeding switches.

Further objects and features of the invention will become apparent from a perusal of the following specification taken in combination with the accompanying drawings of which:

FIGS. 1 and 2, with FIG. 2 to the right of FIG. 1, represents the trunking diagram of the invention.

Figure 1:
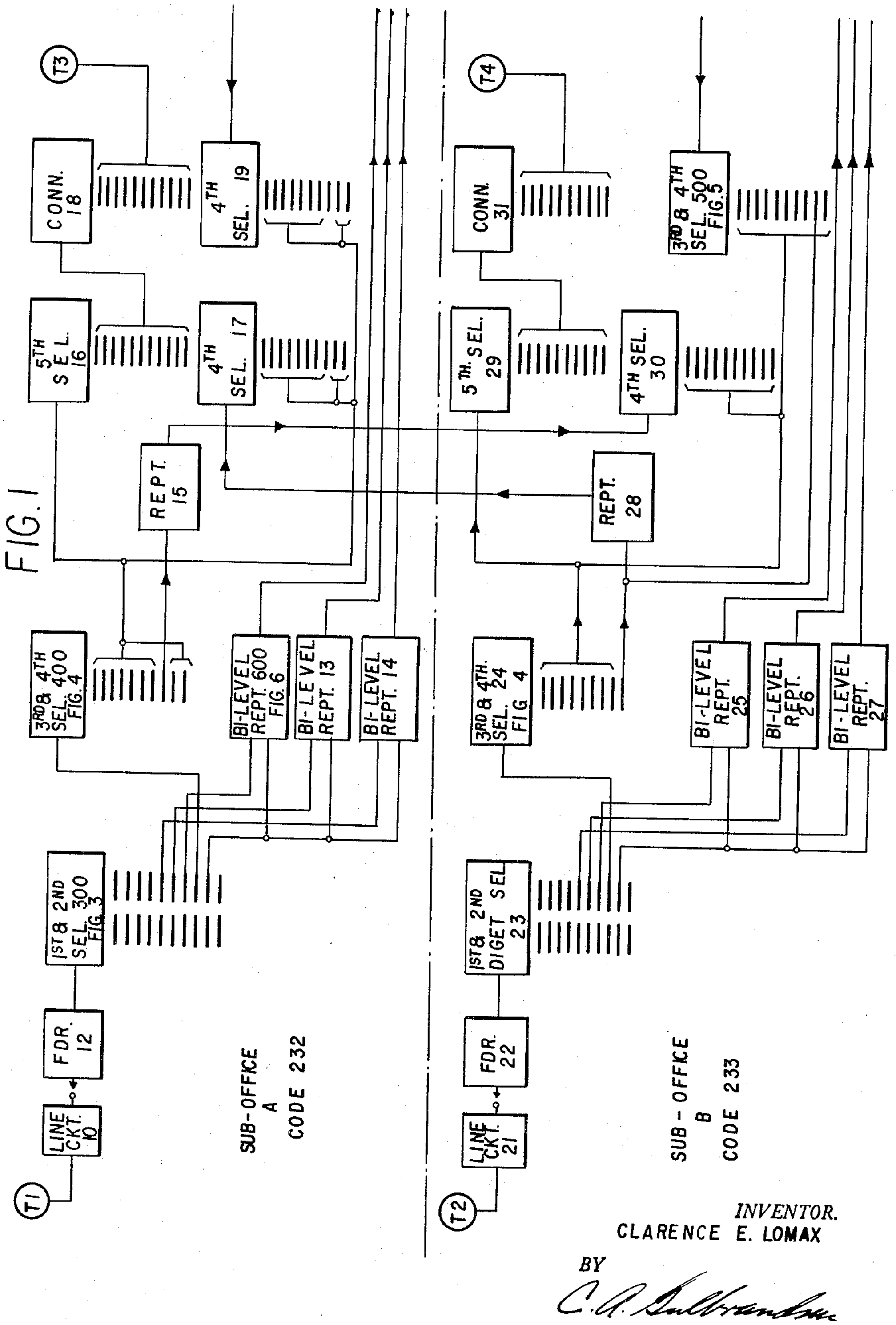
Figure 2:
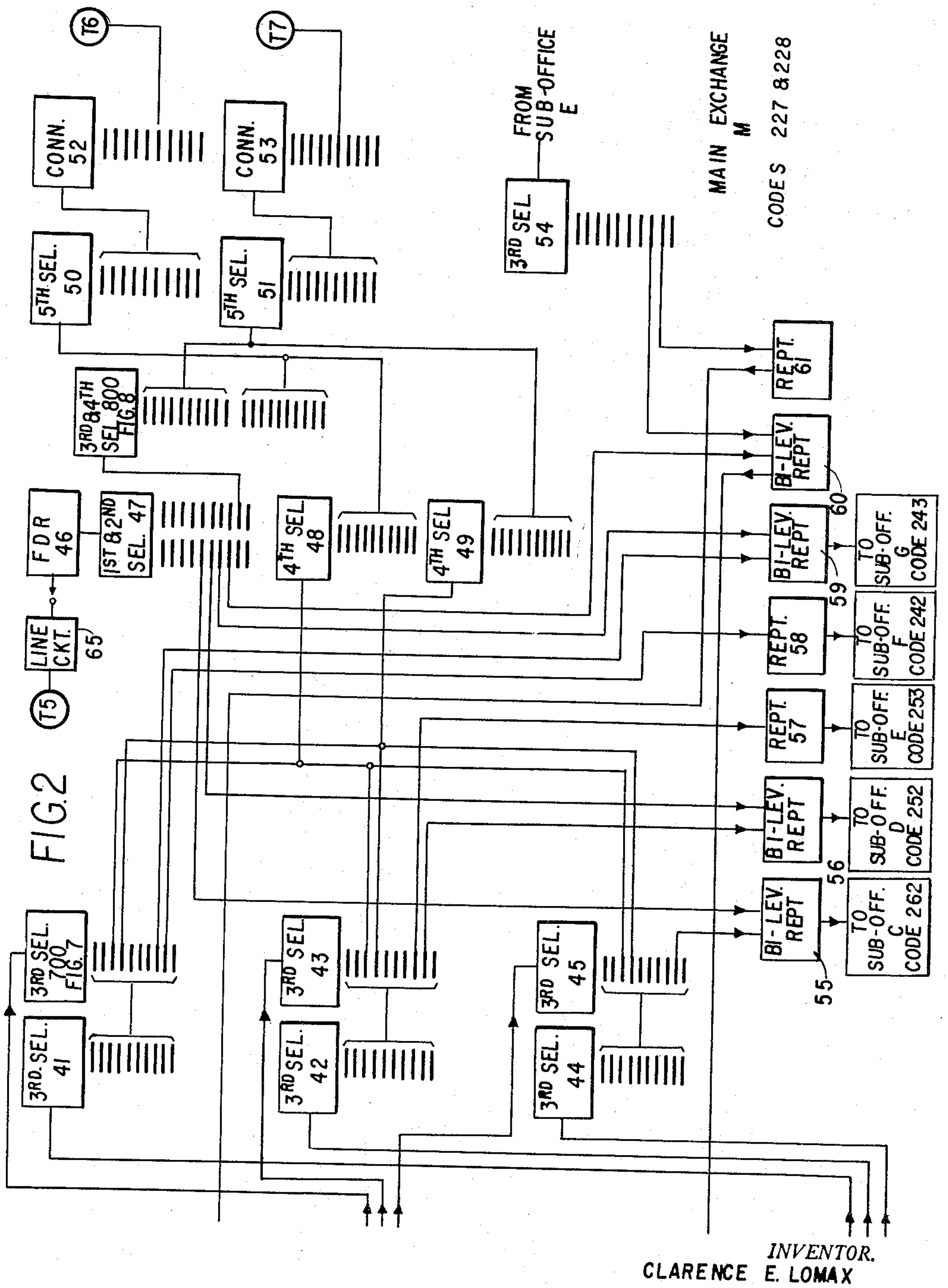

Referring briefly to the trunking diagram shown in FIGS. 1 and 2, a plurality of suboffices A, B, C, D, E, F, and G and a Main Exchange M, each containing its own office code or set of prefix digits. The suboffice codes are as follows: A—232; B—233; C—262; D—252; E—253; F—242; G—243; Main Exchange M—227 and 228.

The mentioned offices are all located within a given area surrounding the Main Exchange M. Certain adjacent suboffices such as A and B shown in FIG. 1 will permit subscribers to dial directly between these suboffices, while the more remote exchanges such as A and E will require subscribers therein to dial through the Main Exchange M. Therefore, by means of the equipment to be described in the ensuing specification, the office code or prefix digits designating a wanted subscriber must always be dialled. In other words, all seven digits of a directory number must always be dialled or the call will be blocked and not completed. By this arrangement or by the arrangement to be more fully described, there will be no dead levels on digit absorbing levels. All levels on the selector switches will be utilized regardless of whether a digit corresponding to these levels may be absorbed once during a dialling sequence, but will not be continuously absorbed as in other known digit absorbing systems.

Figure 3:
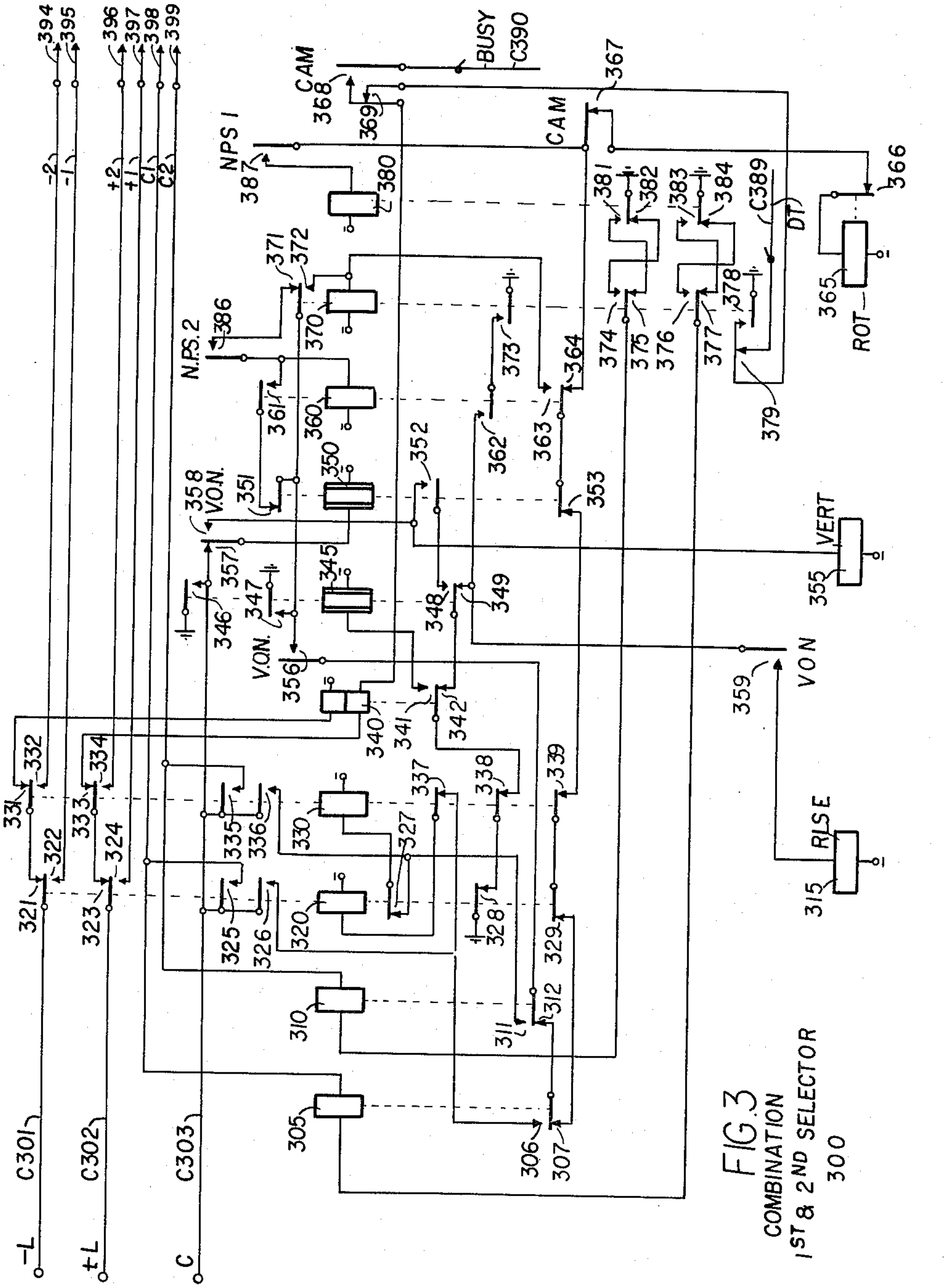
FIG. 3 shows a combination first and second Selector 300 of the twenty-level ten trunk type, including drop-back and digit absorbing features.
Figure 4:
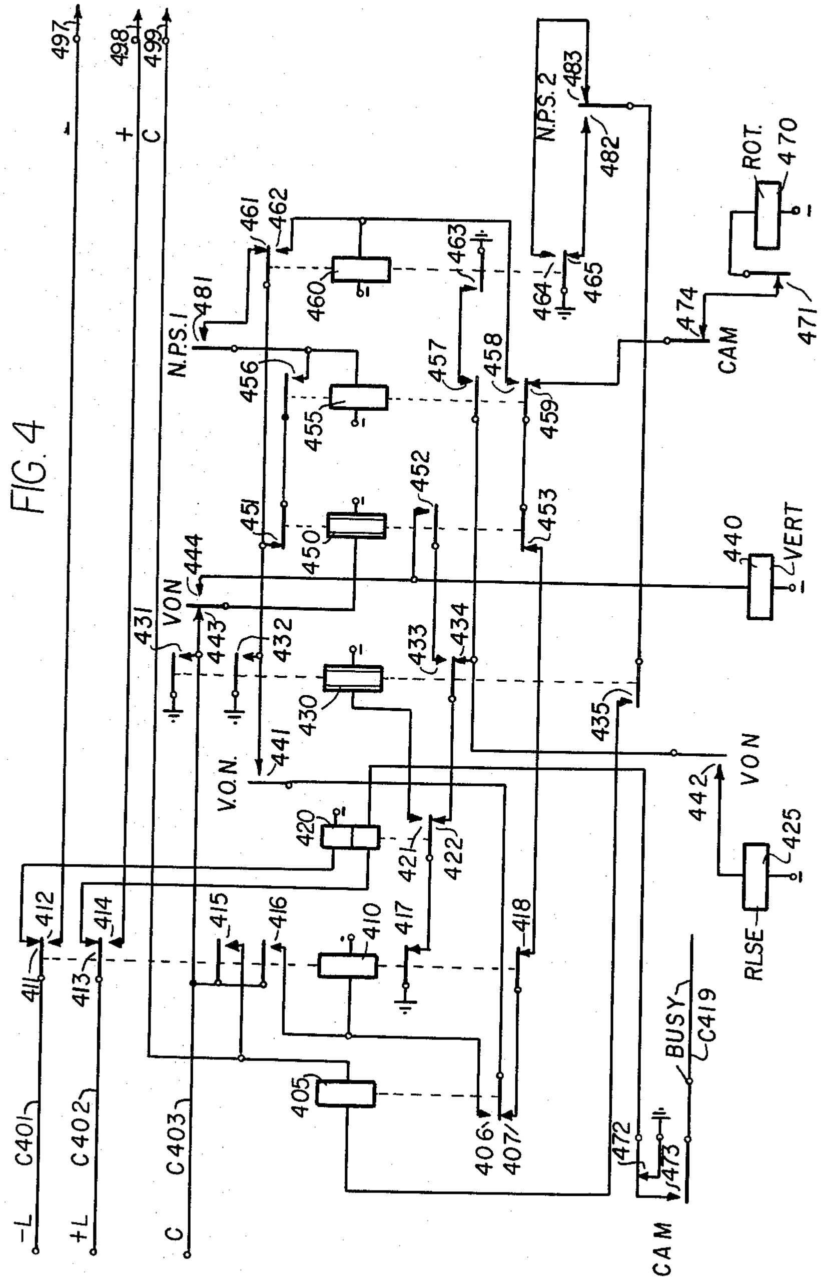
FIG. 4 shows a combination third and fourth Selector 400 including drop-back and digit absorbing features.

Referring to FIG. 3, a combination first and second Selector 300 of the twenty level-ten trunk type is shown. Selector 300 will respond as a first selector in suboffice A upon receipt of first digits "1" and "0" for special service calls and toll calls respectively, which will operate the NPS1 springs and initiate the cut-through on these levels. Selector 300 will respond as a second selector in suboffice A after dialling the first digit "2" for absorption, followed by any second digit from 2–9. If any first digit is received, other than "1," "2" or "0," ground will not be present to operate test relay 305 and the wipers will rotate to the overflow position and return busy tone to the calling subscriber. The digit "2" is the first code digit of every suboffice in the area and is required for all calls therein. For local calls within Suboffice A and calls to Suboffice B, the digits "23" must first be dialled to seize a combination third and fourth Selector such as 400 (FIG. 4). Combination first and second Selector 23 in Suboffice B, and combination first and second Selector 47 in Main Exchange M, are identical to Selector 300 with slight modifications in the normal post springs to absorb different digits.

Referring briefly to Selector 400 (FIG. 4), we have here a combination third and fourth selector, which is somewhat similar to Selector 300. Selector 400 will respond as a third selector upon receipt of the digit "3" to extend a call to Suboffice B via a repeater, such as 15, and a fourth selector, such as 30. Selector 400 will respond as a fourth selector upon receipt of a first digit "2" which is absorbed and thereafter switch-through on any subsequently dialled level except the third level. Combination third and fourth Selector 24 in Suboffice B is identical to Selector 400 with the exception of the levels for operating the normal post springs. Selector 24 responds as a third selector upon receipt of the digit "2," and will absorb a first digit "3" and respond as a fourth selector following absorption upon receipt of any second digit other than the digit "2."

Figure 5:
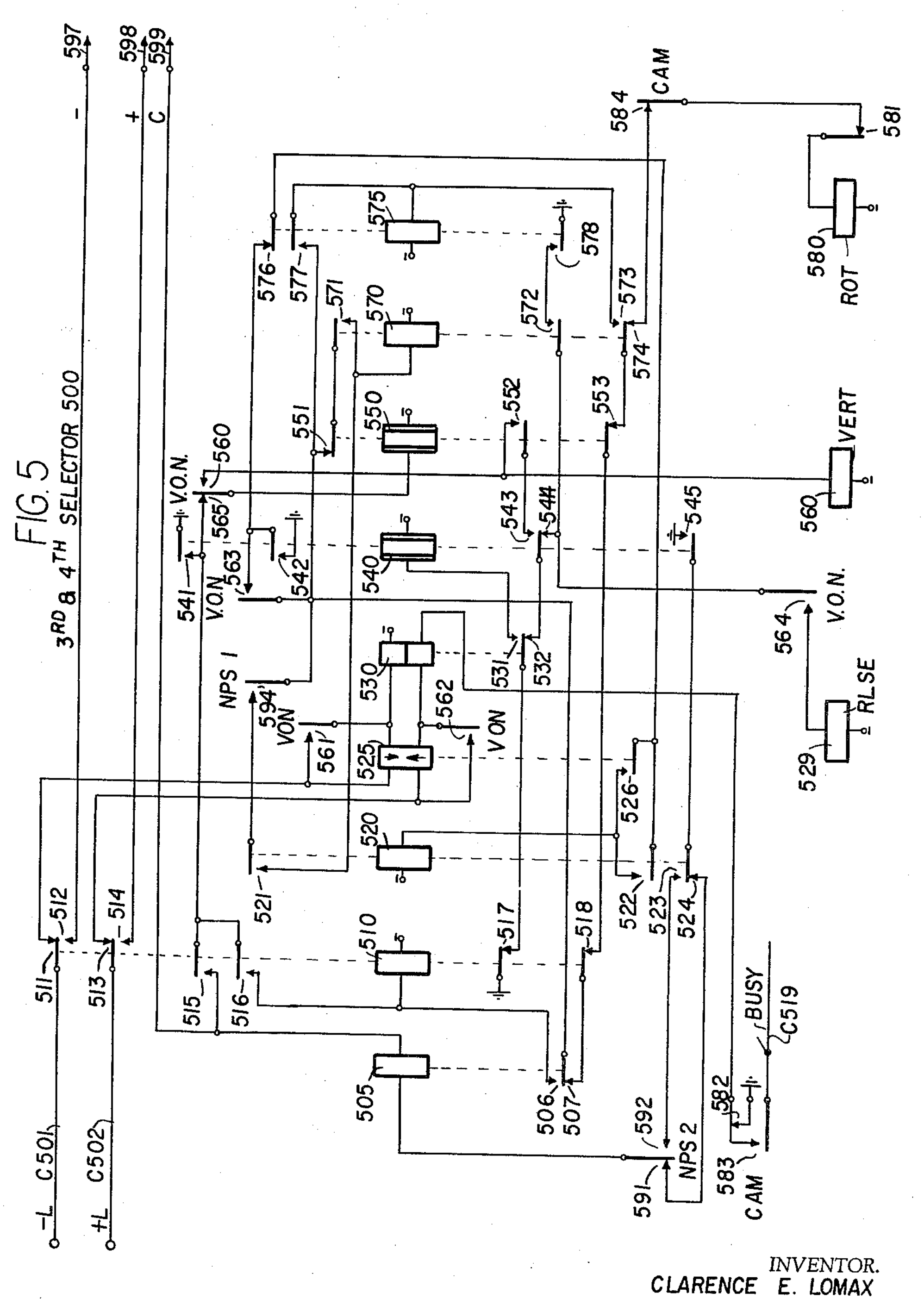
FIG. 5 shows a combination third and fourth Selector 500 including drop-back and digit absorbing features.

Referring briefly to FIG. 5, a combination third and fourth Selector 500 is shown. Selector 500 differs from Selectors 300 and 400 in that it contains a differential relay 525 which is controlled by a linked Bi-Level Repeater 60. When differential relay 525 operates, resulting from ground forwarded by Bi-Level Repeater 60, Selector 500 is conditioned to respond as a third selector. When relay 525 does not operate, Selector 500 will respond as a fourth selector following the absorption of a first digit "3," and the receipt thereafter of any second digit other than the digit "2." The control of differential relay 525 by Bi-Level Repeater 60 will be understood by the brief description to follow regarding Bi-Level Repeater 600 (FIG. 6) to which it is identical.

Figure 6:
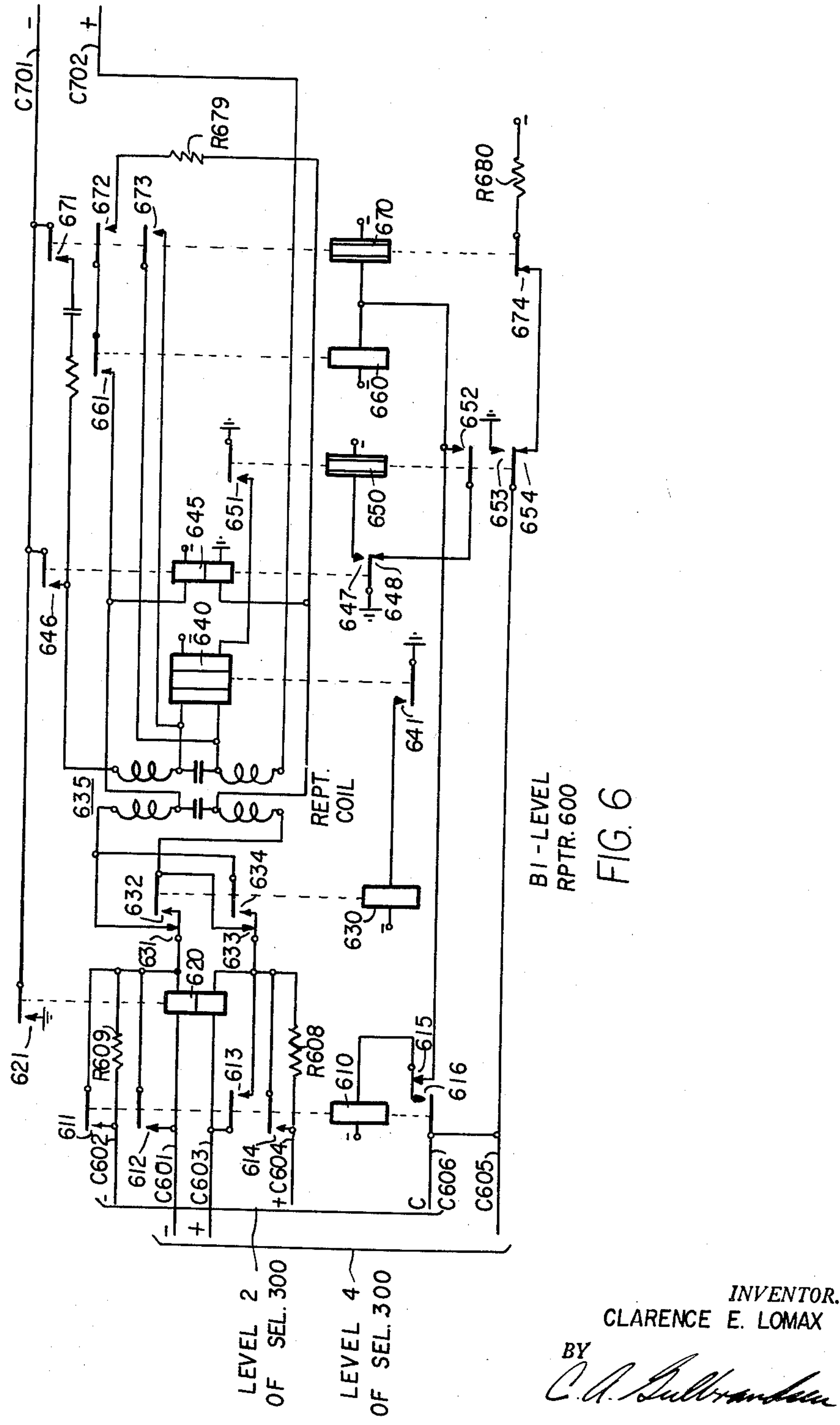
FIG. 6 shows a Bi-Level Repeater 600 linking a Selector 700 (FIG. 7).

Referring briefly to FIG. 6, a Bi-Level Repeater 600 is accessible from two different selector levels. Repeater 600 (FIG. 1) when seized from one level of access, closes a second loop circuit to a third Selector 700 (FIG. 7) for repeating digital impulses thereover. When Repeater 600 is seized from its second level of access, ground is closed over said second loop to Selector 700 to operate a differential relay therein restricting certain levels of access in the selector which will be briefly explained in the following explanation. Bi-Level Repeaters 13, 14, 25, 26, 27, 55, 56, 59, and as mentioned, Repeater 60, are identical to Repeater 600.

Figure 7:
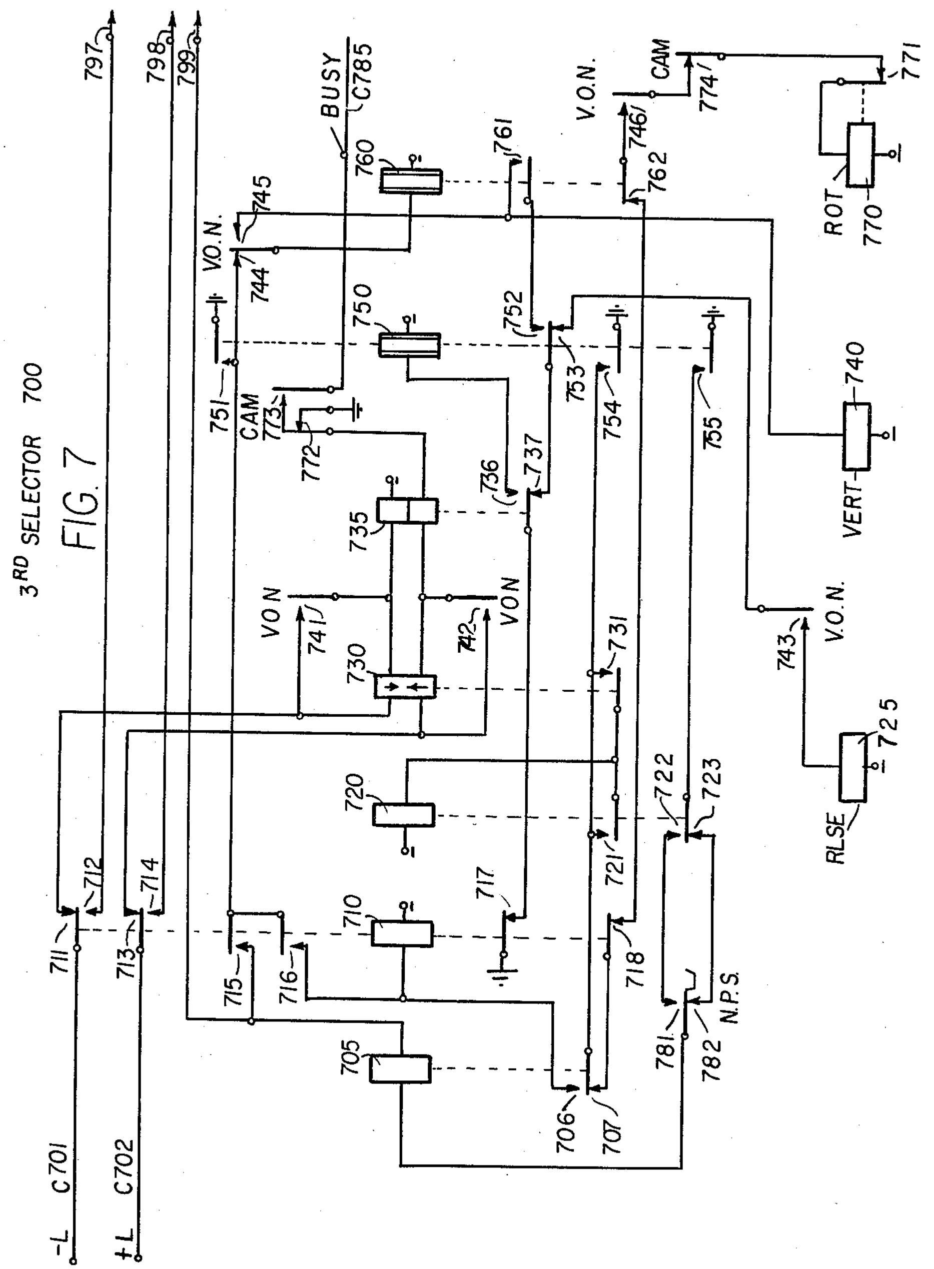
FIG. 7 shows a third Selector 700.

Selector 700 shown in FIG. 7 is a third selector having a differential relay 730 for determining certain restrictions. The operation of differential relay 730 restricts the cut-through digits to be dialled into Selector 700 to the digits "2" and "3." Any other digits dialled under this condition with differential relay 730 operated will cause the wipers to rotate to an overflow position and return busy tone. However, if the differential relay does not operate, any digits dialled into Selector 700, other than digits "2" or "3" will permit cut-through. If the digits "2" or "3" are received by Selector 700 when differential relay 730 is not operated then the Selector 700 blocks the extension of such a call by rotating to the eleventh position busy to transmit the busy tone to the calling subscriber. Selectors 41, 42, 43, 44, and 45 are identical to Selector 700 and will impose similar restrictions.

Figure 8:
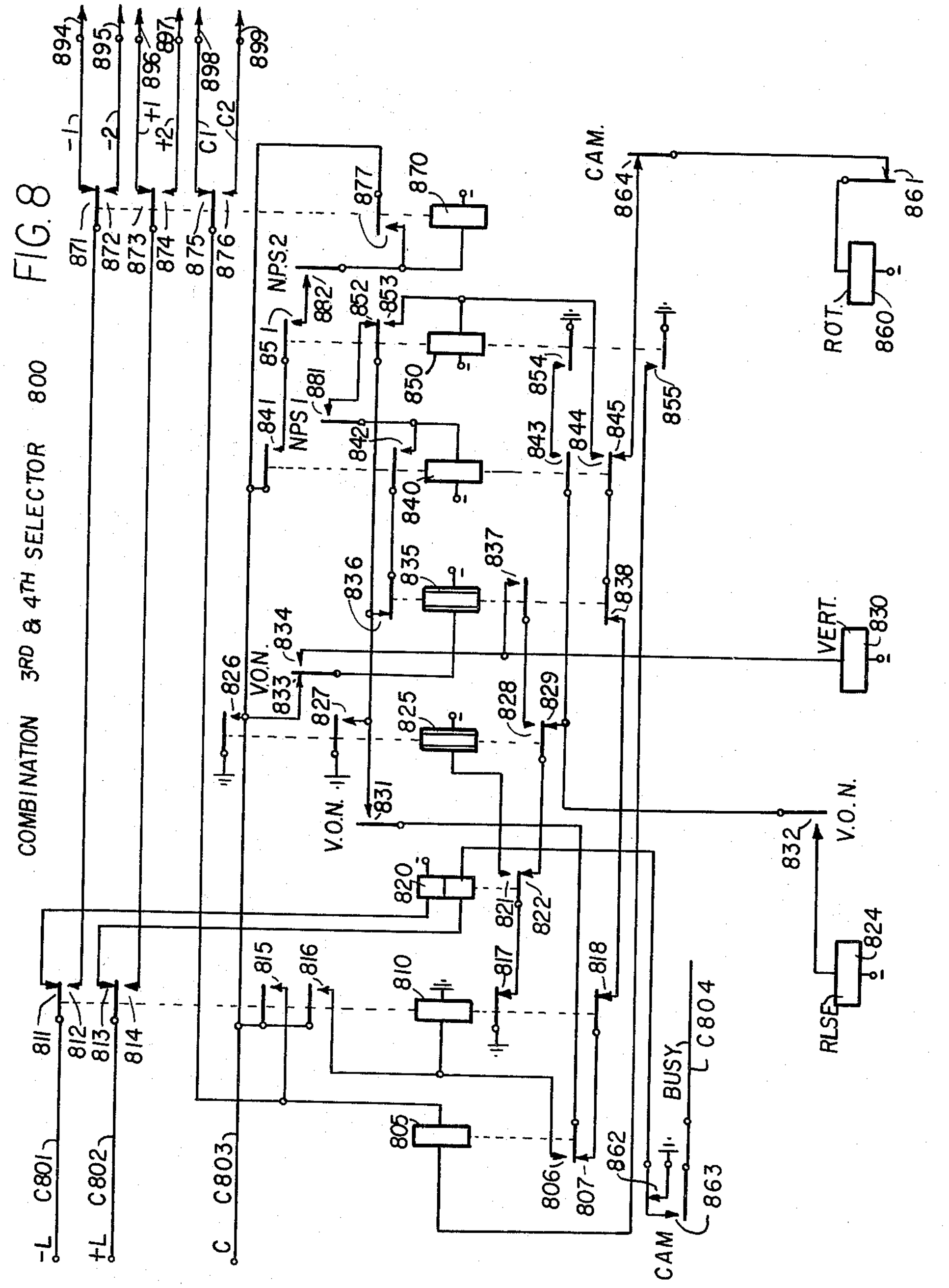
FIG. 8 shows a Combination third and fourth Selector 800 of the twenty level-ten trunk type including drop-back and digit absorbing features.

Referring briefly to FIG. 8 and combination third and fourth Selector 800, we have here a twenty level-ten trunk selector. The first digit received by Selector 800 must be either digit "7" or "8" for absorption and for determining which set of wipers will be utilized. If any other first digit is received, the selector will rotate its wipers to the overflow position and return busy tone. Selector 800 will respond as a fourth selector responsive to the receipt of the following digit, including the receipt of either digits "7" or "8" which will not be absorbed a second time.

Figure 9:
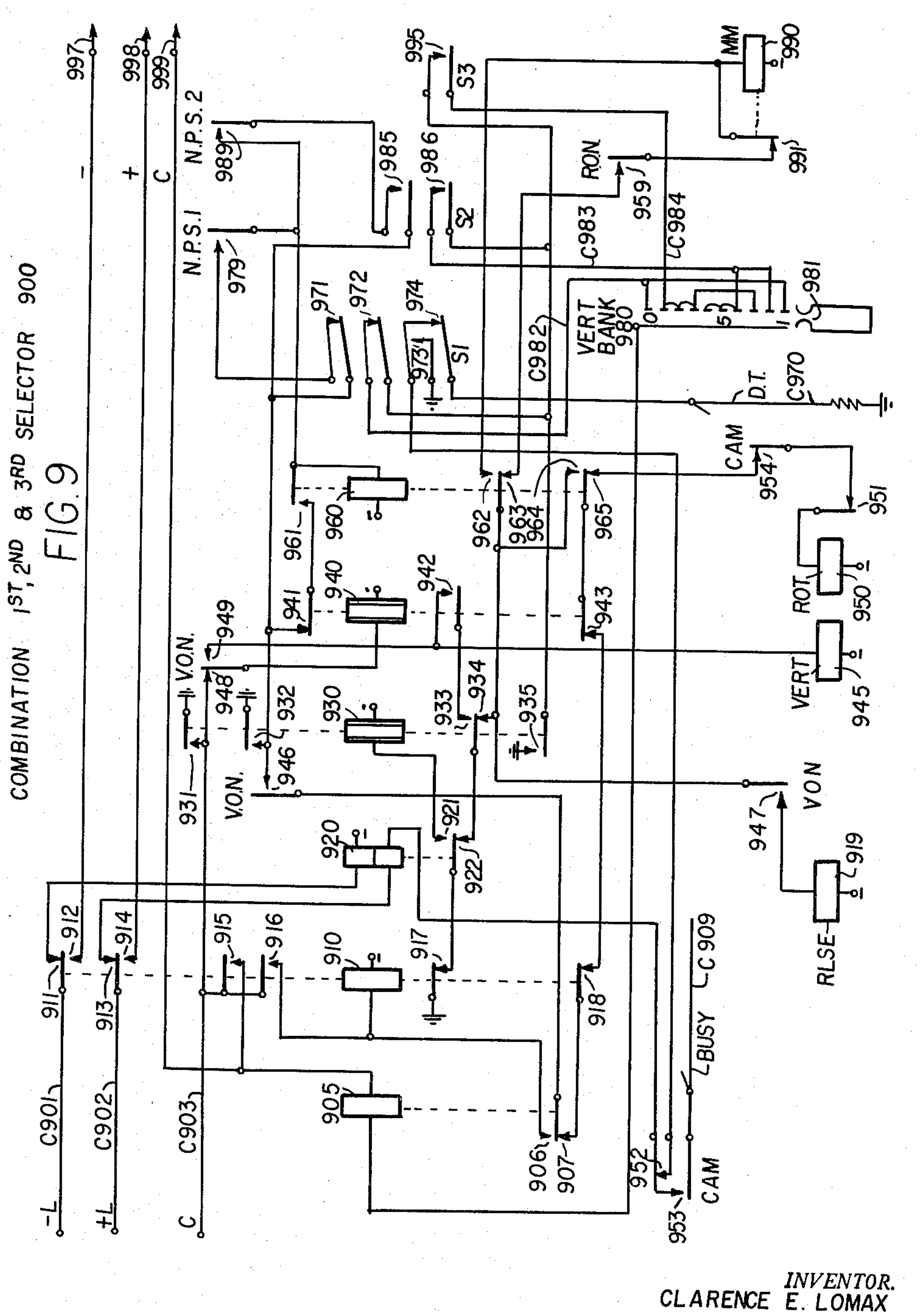
FIG. 9 shows a Combination first, second and third Selector 900 used in a modification trunking diagram.

In FIG. 9 we have a combination first, second, and third Selector 900. Selector 900 is a modification of Selector 300 (FIG. 3). Selector 900 will respond as a first selector upon receipt of the digit "1" or "0"; will respond as a second selector upon receipt of the digits "22," "24," "25," or "26"; and will repsond as a third selector upon receipt of the digits "233," "237," "238," or "239." Thus, every level on the Selector 900 is utilized providing the above sequences of dialled digits are utilized. If not, the wipers will rotate to the overflow position and return busy tone. Three sets of cam operated springs S1, S2 and S3 control ground to different sets of bank contacts on a vertical bank 980, and the received digit in order to permit cut-through, must be a digit corresponding to a grounded contact to permit operation of a test relay 905. For instance, the normally operated cam springs S1 close ground to contacts 1 and 0 on vertical bank 980, necessitating the dialling of the digits "1" or "0" to permit cut-through. A first digit "2" received by Selector 900 is an absorbing digit. The cam operated springs sequentially operate and restore responsive to the absorbing of a digit under the control of a motor magnet 990. The cam springs S1 and S2 also control circuits to a digit absorbing relay 960 in conjunction with a set of normal post springs NPS1 and NPS2. The NPS1 springs operate on the second level of bank contacts, and the NPS2 springs operate on the third level of bank contacts. However, digit absorbing relay 960 will operate only when both the S1 and NPS1 springs are operated at the same time, and likewise relay 960 will operate only when both the S2 and NPS2 springs are operated at the same time. Therefore, it is not necessarily the digit dialled that brings about digit absorption, but rather the sequence in which the digits are received.

Having briefly described the circuits in the invention a more detailed description will now follow.

CALLS FROM SUBOFFICE A

Assuming that a subscriber T1 in suboffice A desires to call a local party T3, the removal of the handset will cause a finder 12 to seize the line circuit 10 extending to the calling line in a well-known manner. Finder 12 being linked with combination first and second Selector 300 (FIG. 3) will extend the loop circuit from the calling party's handset to Selector 300; the loop circuit extending from battery, upper winding of line relay 340, contacts 331, 321, negative conductor C301, back over the caller's loop, positive conductor C302, contacts 323, 333, lower winding of relay 340, eleventh position cam contacts 369, contacts 379, and over conductor C389 to dial tone and ground. Over this loop circuit relay 340 operates, and closes at contacts 341 a circuit to relay 345 via contacts 338 and 328. Relay 345 operates, and at contacts 346 closes ground over control conductor C303 to hold the preceding equipment, and also closes an obvious circuit to relay 350. At contacts 348 relay 345 prepares a circuit to vertical magnet 355. At contacts 347 a circuit is prepared to relay 360.

As previously mentioned, the office code of Suboffice A is "23" which must be the first two digits dialled by the calling subscriber. Upon receipt of dial tone the calling party will dial the digit "2" whereupon relay 340 will intermittently restore and operate two times whereby, contacts 342 will intermittently close and open to pulse the vertical magnet 355; the circuit extending from ground, contacts 328, 338, 342, 348, 352, winding of magnet 355 to battery. The wipers 394, 395, 396, 397, 398, and 399 will thus take one step each time the vertical magnet 355 is energized. Relay 345 being slow-to-release remains operated during the intermittent opening of contacts 341. Upon the wipers stepping off normal, the VON springs will operate whereby, at VON contacts 357 the circuit to relay 350 is opened, however, at VON contacts 358 relay 350 will be maintained operated over a circuit in parallel with the stepping circuit. At VON contacts 356 a circuit is prepared to rotary magnet 365. At VON contacts 359 a circuit is prepared to release magnet 315. At the termination of the first dialled digit, relay 350 will restore after a short duration due to its slow-to-release characteristics, to open the circuit to vertical magnet 355 at contacts 352. Upon the wipers being stepped to the second level, the normal post springs NPS2 will operate, to close a circuit to relay 360 via NPS2 contacts 386, contacts 371 and 347. Relay 360 operates before slow-to-release relay 350 restores, and at contacts 363 prepares a circuit to relay 370. At contacts 364 a prepared circuit to rotary magnet 365 is further opened. Contacts 361 prepares, by way of contacts 351, an obvious locking circuit to relay 360. A circuit to relay 370 is closed, when relay 350 restores, extending from battery, winding of relay 370, contacts 363, 353, 339, 329, 307, 312, 356, 347, to ground. Relay 370 operates, and at contacts 372 locks itself operated over an obvious path. At contacts 373 a circuit is closed to release magnet 315 via contacts 362 and 359. At contacts 374 and 376 ground is placed on control wipers 398 and 399 via the windings of relays 305 and 310 respectively. At contacts 378 ground replaces dial tone through the lower winding of relay 340. Release magnet 315 energizes to restore the wipers to normal, restoring the VON springs to in turn deenergize the release magnet and reoperate relay 350. Also, the NPS2 contacts 386 open to their normal position. The reoperation of relay 350 opens at contacts 351 the locking circuit to relay 360, causing restoration thereof.

The calling subscriber T1 will now dial the next digit, the digit "3" whereupon, relay 340 will intermittently restore and operate to pulse vertical magnet 355 three times over the path previously described to thereby step wipers 394—399 to the third level. The third level being unrestricted will now close a circuit to rotary magnet 365 upon the restoration of relay 350; the circuit extending from battery, winding of rotary magnet 365, contacts 366, 367, 364, 353, 339, 329, 307, 312, 356, 347 to ground. By means of its self-interrupter contacts 366 rotary magnet 365 will intermittently deenergize and energize to rotate the wipers over the third level of back contacts. The control wipers 398 and 399 will search simultaneously over their respective third levels in search of an idle third selector containing battery on its control bank contact. Assuming that combination third and fourth Selector 400 (FIG. 4) is found idle, battery will appear on control conductor C403 via the winding of relay 450. Had Selector 400 been found idle by control wiper 398, test relay 305 would operate via contacts 376 and 384, and had another selector similar to Selector 400 been found idle by wiper 399, test relay 310 would operate via contacts 374 and 382. Assuming first the operation of test relay 305, whereby contacts 307 would open the rotary circuit to deenergize rotary magnet 365. At contacts 306 a circuit is closed to relay 320, extending from battery, winding of relay 320, contacts 337, 306, 312, 356, 347 to ground. Relay 320 operates, and at contacts 322 and 324 extends the loop circuit over the first set of wipers, namely 395 and 397. At contacts 325 the control conductors of Selectors 300 and 400 are interconnected, and at contacts 326 a locking circuit for relay 320 is closed from ground extended over the succeeding control conductor from Selector 400. At contacts 321 and 323 the circuit to relay 340 is opened, and at contacts 328 the circuit to relay 345 is opened. Relay 340 restores to further open the circuit to relay 345 at contacts 341. Relay 345 restores, and opens at contacts 347 the locking circuit to relay 370. Relay 370 restores, and opens contacts 374 to restore relay 305. Assuming test relay 310 had operated instead of test relay 305, the above mentioned operations would have taken place with the exception that relay 330 would operate in this case and extend the loop circuit over the second set of wipers 394 and 396 via contacts 332 and 334.

Had no idle combination third and fourth selector been found idle by either control wiper 398 or 399, the wipers would self-interruptedly rotate to the eleventh off-normal position to operate the cam springs whereby; at cam contacts 367 the rotary circuit is opened to deenergize rotary magnet 365; at cam contacts 369 ground is removed from the operating circuit of relay 340 and replaced by busy tone at cam contacts 368 via conductor C390. This busy tone will be returned to the calling party notifying him of an all-trunks busy condition. The calling party would then proceed to hang up the receiver to release the equipment in a manner to be disclosed in the ensuing description.

Assuming that combination third and fourth Selector 400 (FIG. 4) was found idle as described, relay 450 would operate ground forwarded over C conductor C403. At contacts 452 relay 450 prepares a circuit to vertical magnet 440. The seizure of Selector 400 will also extend the loop circuit to operate line relay 420; the circuit extending from battery, upper winding of relay 420, contacts 411, conductor C401, back over the loop, conductor C402, contacts 413, lower winding of relay 420, cam contacts 472 to ground. At contacts 421 relay 420 closes an obvious circuit to relay 430. Relay 430 operates and at contacts 431 closes ground to control conductor C403 to hold the preceding equipment. At contacts 432 circuits are prepared to relays 455 and 460.

The next or third digit to be dialled must be the digit "2" for absorption. Upon receipt of the two digital impulses relay 420 restores and operates two times, to intermittently close and open contacts 422. The intermittent closure of contacts 422 closes a circuit to vertical magnet 440 over a circuit including contacts 417, 433, and 452. Vertical magnet 440 will thus intermittently energize to vertically step the wipers 497, 498 and 499 one step for each energization. Upon the wipers stepping off normal, the VON springs operate whereby; VON contacts 441 close to prepare a circuit to relay 460 and rotary magnet 470; VON contacts 442 close to prepare a circuit to release magnet 425; VON contacts 443 open the operating circuit to relay 450, however, VON contacts 444 close the pulsing circuit to relay 450 to maintain relay 450 operated during pulsing. Relay 430 being slow-to-release remains operated during the intermittent opening of contacts 421.

At the end of the receipt of the third digit, the wipers 497—499 will be on the restricted second level to operate the normal post springs NPS1. And after a short duration slow-to-release relay 450 will restore. NPS1 contacts 481 close an obvious circuit to relay 455. Relay 455 operates before relay 450 restores, to open the prepared rotary circuit to rotary magnet 470 at contacts 459. Upon the restoration of relay 450 a locking circuit for relay 455 is closed via contacts 451 and 456. Also, contacts 458 close a circuit to relay 460 via contacts 453, 418, 407, 441, 432 to ground. Relay 460 operates closing an obvious locking circuit for itself at contacts 462. At contacts 464 ground is placed on control wiper 499 via contacts 483, 435 and winding of test relay 405. At contacts 463 an obvious circuit is closed to release magnet 425. Release magnet 425 energizes to return wipers 497—499 to normal, which in turn restores the VON springs to normal to thus deenergize release magnet 425 upon reopening VON contacts 442. VON contacts 443 reclose to reoperate relay 450. The NPS1 springs restore contacts 481 upon restoration of the wipers. The reoperation of relay 450 opens the locking circuit to relay 455 to cause deenergization thereof.

Had the calling party inadvertently dialled any digit other than "2" or "3" as the third digit, no ground would appear on control wiper 499, and the wipers would rotate to the eleventh position and return busy tone via conductor C419 upon the closing of cam contacts 473. The dialling of the digit "3" as the third digit will be explained in the ensuing description.

The calling subscriber will thus proceed to dial the fourth digit (any digit except "3"). Assuming that the next digit dialled is the digit "4" line relay 420 will intermittently deenergize to intermittently pulse vertical magnet 440 four times over a previously described path. Upon the wipers 497—499 taking their first step, the VON springs will operate to close VON contacts 441 and prepare a circuit to rotary magnet 470. Relay 450 will again operate in parallel with the pulsing circuit upon closure of VON contacts 444. At the end of the series of digital impulses the wipers 497—499 will lie adjacent the fourth level of bank contacts, and relay 450 will restore after a short duration. The restoration of relay 450 at contacts 453 closes a circuit to rotary magnet 470; the circuit extending from battery, winding of rotary magnet 470, contacts 471, 474, 459, 453, 418, 407, 441, and 432 to ground. By means of its self-interrupter contacts 471, rotary magnet 470 will interrupt its operating circuit to rotate the wipers over the fourth level in search of an idle fifth selector. Assuming that an idle fifth selector is found, for instance fifth Selector 16, battery will appear on the C conductor thereof to operate test relay 405 over a previously traced path. At contacts 407 relay 405 opens the rotary circuit to cease rotation of the wipers and deenergize rotary magnet 470. At contacts 406 a circuit is closed to relay 410 via contacts 441 and 432. Relay 410 operates and at contacts 411 and 413 opens the circuit to relay 420. Contacts 412 and 414 close the loop circuit via wipers 497 and 498 to fifth Selector 16. At contacts 415 the control conductors are interconnected between Selectors 400 and 16. At contacts 416 a locking circuit is closed to relay 410 over control wiper 499 upon the return of ground from Selector 16 in a well-known manner. At contacts 417 relay 410 opens the circuit to relay 430. The restoration of relay 430 opens contacts 432 and the locking circuit to relay 460. Relay 460 restores opening the circuit at contacts 464 to restore test relay 405.

Assuming that the subscriber T1 inadvertently dialled the digit "3" following the previously dialled digits "232," wherein the last digit "2" was absorbed as described. In this case after the absorption relays, 420, 430, 450 and 460 are operated as previously described. The receipt of the digit "3" as the next digit, will cause the wipers to step to the third level in a manner described, to open normal post NPS2 contacts 483 to thus open the operating circuit to switch-through relay 405 and prevent its operation even should an idle trunk be encountered during rotation of the wipers. The fourth digit "3" is thus blocked.

Assuming that no idle fifth selector was found during rotation of the wipers, the wipers would rotate to the eleventh rotary position. The eleventh position cam springs would thus operate whereby; at cam contacts 473 busy tone including ground therein will be closed from conductor C419 and transmitted back to the calling party; cam contacts 474 opens the circuit to rotary magnet 470 to prevent its intermittent operation. Upon receipt of the busy tone the calling party will hang up and release the equipment in a manner to be described in the ensuing disclosure.

Assuming fifth Selector 16 is found idle as mentioned, it will operate in a conventional manner well-known in the art. Upon receipt of the fifth digit, Selector 16 will step and search for an idle connector, in a group including Connector 18. Assuming Connector 18 is found idle, it will operate and await receipt of the last two digits of the directory number of substation T3. Upon receipt of the last two digits, Connector 18 will seize the called line (providing it is not busy) and ring the called party in a well-known manner. Upon the called party answering, the talking circuit is completed and conversation will take place in the well-known manner.

Assuming that subscriber T1 desires to call subscriber T4 in Suboffice B, the removal of the handset will cause Finder 12 to seize Line Circuit 10 as before mentioned. Combination first and second Selector 300 will again assumed to be seized. It will further be assumed that Selector 400 (FIG. 4) will be seized upon dialling the first two digits "23" in a manner previously described. Upon seizure, relays 420, 430, and 450 will operate in Selector 400 as before described. In the present case Selector 400 will now operate only as a third selector instead of as a third and fourth selector as previously described. To accomplish this, the third digit dialled must be the digit "3," whereby Selector 400 will step to the third level in a manner previously described. The wipers being stepped to the third level will operate the NPS2 springs closing contacts 482 to place ground on control wiper 499 via contacts 465, 435 and the winding of test relay 405. Relay 450 restores to close the previously traced circuit to rotary magnet 470 via contacts 453. The wipers 497—499 in this case will rotate in search of an idle repeater linking a fourth selector. Upon the wipers finding an idle repeater (battery on the control conductor), Selector 400 will extend the loop circuit in a manner previously described. Assuming Repeater 15 and fourth Selector 30 are seized by Selector 400, Repeater 15 will repeat the next digit to Selector 30 in a conventional manner. It will further be assumed that the remaining digits dialled will seize fifth Selector 29 and Connector 31 to ring substation T4 in a well-known manner.

Selector 300 (FIG. 3) as mentioned is a combination first and second selector to provide special service upon dialling the single digit "1," or toll calls upon dialling the single digit "0." As previously mentioned, upon seizure, relays 340, 345 and 350 operate. Upon receipt of digital impulses (digit 1 or 0), the wipers will step accordingly in a manner previously described. At the end of dialling, the NPS1 springs operate (on the first or tenth level), and relay 350 restores after a short duration, closing at NPS1 contacts 387 and contacts 353 a circuit to relay 380, via contacts 364, 339, 329, 307, 312, 356, and 347 to ground. Relay 380 operates and at contacts 381 closes ground to control wiper 399 via the winding of test relay 310. Contacts 383 closes ground to control wiper 398 via the winding of test relay 305. The restoration of relay 350 also closes a circuit to rotary magnet 365; the circuit extending from battery, winding of rotary magnet 365, contacts 366, 367, 364, 353, 339, 329, 307, 312, 356, and 347 to ground. By means of its self-interrupter contacts 365, rotary magnet 365 will rotate the wipers 394—399 in search of an idle trunk (not shown) and switch through in a manner previously described.

Assuming that the subscriber T1 inadvertently dials any first digit from 3 to 9, these digits will be responded to and the wipers will be stepped to their corresponding levels, and rotated thereover, to the eleventh rotary position regardless of whether or not the wipers engage an idle trunk. For instance, assuming the receipt of any digit from "3–9," relays 340, 345, 350 and the vertical magnet 355 will respond in a manner previously described. However, since none of the mentioned digits will operate the normal post springs on their respective corresponding levels of bank contacts, neither relay 370 or 380 will operate. Therefore, neither of the switch-through relays 305 or 310 will have an operating circuit over which to operate, when the wipers rotate over the selected level. The wipers would instead rotate to the eleventh rotary position and return busy tone to the calling party, by actuating and closing the cam contacts 368.

The inadvertent dialling of an incorrect second digit "1" or "0" will have the same effect as above with a few exceptions. After having absorbed the first digit "2," relay 370 will have locked operated as previously described, as well as relays 340, 345 and 350 operating. The dialling of the second digit "1" or "0" will cause relays 340, 345, 350 and the vertical magnet 355 to respond and step the wipers to the corresponding level (first or tenth); whereby NPS1 spring contacts 387 will close and after relay 350 restores the previously traced circuit to operate relay 380 is closed. With both relays 370 and 380 operated, the operating circuits for both switch-through relays 305 and 310 are opened, to prevent their operation regardless of whether or not an idle trunk is found during rotation of the wipers over either of these levels of bank contacts. The wipers would thus rotate to the eleventh rotary position and return busy tone, thereby blocking such calls.

Assuming next that subscriber T1 desires to call subscriber T6 in the Main Exchange M (FIG. 2). The office codes for the main exchange as previously mentioned are 227 and 228. In order to reach subscriber T6 the first three digits "228" must be dialled. It will further be assumed that the calling subscriber T1 has dialled the digit "2" into Selector 300 (FIG. 3) whereby relays 340, 350, and 370 are operated after absorption of this digit in a manner previously described. The dialling of the second digit, also the digit "2," will step the wipers again to the second level and operate the NPS2 springs. However, in this case relay 360 will not operate because its operating circuit is opened at contacts 371 since relay 370 locked operated after the first digit "2." Thus, after a short duration relay 350 restores to complete a circuit to rotary magnet 365 via contacts 366, 367, 364, 353, 339, 329, 307, 312, 356, 347 to ground. The wipers 394—399 will rotate in search of an idle bi-level repeater linking a third selector.

Assuming that Bi-Level Repeater 600 (FIG. 6) is found idle by Selector 300, battery on control conductor C606 will be found by either control wiper 398 or 399 to switch Selector 300 through in a manner previously described. As previously mentioned, Bi-Level Repeater 600 is seized through the second level of Selector 300 to extend the loop circuit over conductors C602 and C604 to operate relay 645; the circuit extending from battery, upper winding of relay 645, upper primary winding of repeat coil 635, contacts 631, resistance R609, negative conductor C602, back over the loop, positive conductor C604, resistance R608, contacts 633, lower primary winding of repeat coil 635, lower winding of relay 645 to ground. Relay 645 operates and at contacts 646 closes a loop to third Selector 700. At contacts 647 an obvious circuit is closed to relay 650. Relay 650 operates, and at contacts 651 closes an obvious circuit through the secondary winding of polar relay 640 however, relay 640 being of the polarized type will not operate due to its primary winding being polarized in directional opposition. At contacts 652, circuits are prepared to relays 610, 660, and 670. At contacts 653 ground is returned over the control conductor C606 to hold the preceding equipment in a manner described.

The closure of a loop circuit to Selector 700, operates relay 735; the circuit extending from battery, upper winding of relay 735, upper winding of relay 730, contacts 711, negative conductor C701, contacts 646 (FIG. 6), upper secondary winding of repeat coil 635, primary winding of polar relay 640, lower secondary winding of repeat coil 635, positive conductor C702, contacts 713, lower windings of relays 730 and 735 respectively, cam contacts 772 to ground. Relay 730 being of the differential type will not operate over this circuit. At contacts 736, relay 735 closes an obvious circuit to relay 750. Relay 750 operates and at contacts 751 closes an obvious circuit to relay 760. At contacts 752 a circuit is prepared to vertical magnet 740. Contacts 754 close to prepare a circuit to rotary magnet 770. Contacts 755 close to ground control wiper 799 via contacts 723, 782 and the winding of relay 705. Relay 760 operates closing contacts 761 to further prepare a circuit to vertical magnet 740 and prepares a second circuit for itself. Contacts 762 open the prepared circuit to rotary magnet 770.

The calling party will dial the third digit, the digit "8" whereupon, relay 645 will intermittently restore eight times to intermittently open contacts 646 and repeat this digit to Selector 700. Relay 650 being slow-to-release remains operated during the intermittent openings of contacts 647. Upon the first restoration of relay 645, contacts 648 close circuits to relays 610, 660, and 670 over obvious paths. Relay 610 operates, locking to grounded control conductor C606 at contacts 616. Contacts 611 and 614 close to bypass resistors R609 and R608 to improve pulsing. Contacts 612 and 613 close but are ineffective on calls from this level. Relay 660 intermittently operates and closes contacts 661 to aid in pulsing relay 645. Relay 670 being slow-to-release operates and remains operated during the intermittent openings of contacts 648. At contacts 671 relay 670 improves pulsing to Selector 700 by bridging a spark quenching circuit across pulsing contacts 646. At contacts 672 the intermittent priming path to insure relay 645 intermittent reoperation via contacts 661 is closed. Contacts 673 close to shunt polar relay 640 to prevent its accidental operation during pulsing.

Relay 735 in Selector 700 (FIG. 7) will intermittently restore responsive to the receipt of the repeated digital impulse series. Upon each restoration of relay 735 a circuit is closed to vertical magnet 740 via ground, contacts 717, 737, 752, 761, winding of magnet 740 to battery. Thus, vertical magnet 740 will intermittently energize to vertically step the wipers 797, 798, and 799. Upon the wipers stepping vertically off normal, the VON springs will operate whereby; VON contacts 741 and 742 close to improve pulsing to relay 735 by bypassing differential relay 730; VON contacts 743 close to prepare a circuit to release magnet 725; VON contacts 744 opens the operating circuit to relay 760, however, VON contacts 745 close to maintain relay 760 operated through the pulsing circuit to vertical magnet 740; VON contacts 746 close to prepare a circuit to rotary magnet 770. The wipers 797–799 will thus step to the eighth level of bank contacts.

At the end of the third series of digital impulses, relay 660 will restore, and shortly thereafter slow-to-release relay 670 restores upon the steady reoperation of relay 645. After a short duration slow-to-release relay 760 will restore and vertical magnet 740 restores at the termination of the repeated impulse series from Repeater 600, and at contacts 762 closes a circuit to rotary magnet 770; the circuit extending from battery, winding of rotary magnet 770, contacts 771, 774, 746, 762, 718, 707 and 754 to ground. By means of its self-interrupter contacts 771 the rotary magnet 770 will intermittently open its operating circuit to rotate the wipers. The wipers will thus search for an idle fourth selector.

Assuming that fourth Selector 48 is found idle by the wipers of Selector 700, control wiper 799 will engage battery to close a circuit to test relay 705. Test relay 705 operates, opening contacts 707 and the circuit to rotary magnet 770 to cause deenergization thereof and stop rotation of the wipers. At contacts 706, an obvious circuit is closed to relay 710. Relay 710 operates opening contacts 711 and 713 to open the circuit to relay 735. Contacts 712 and 714 close the second loop circuit from Repeater 600 to fourth Selector 48 via wipers 797 and 798. Contacts 715 and 716 close to provide a locking circuit for relay 710 upon a change in polarity while shunting out relay 705. Contacts 717 open the circuit to relay 750. Contacts 718 further open the rotary circuit. Relays 705 and 735 restore, and after a short duration slow-to-release relay 750 restores.

Fourth Selector 48 being of conventional design will respond to the next repeated series of digital impulses from Repeater 600 in a well-known manner. Assuming fifth Selector 50 and Connector 52 are seized responsive to the receipt of the remaining repeated digits, with the last digit choosing the ringing frequency to ring substation T6. Upon the called party at substation T6 answering the call by removing the receiver, a reversal in polarity will take place at connector 52 in a well-known manner to operate polar relay 640. The operation of polar relay 640 closes contacts 641 to complete an obvious circuit to relay 630. Relay 630 operates and closes 632 and 634 to reverse polarity from relay 645 for metering and supervisory purposes. Conversation will now take place between substation T1 and T6.

Had the call been intended for substation T7, the dialling of the third digit, the digit "7," a fourth Selector such as 49 would have been seized by third Selector 700 in a manner described. The fifth Selector, such as 51, and a connector such as 53 would be seized in a conventional manner, to complete the call to substation T7.

Referring to third Selector 700, had the calling subscriber at substation T1 inadvertently dialled the digit "2" or "3" as the third digit, the normal post springs NPS would operate to block the extension of the call to Suboffices F or G. For instance, upon the wipers being stepped to the second level of back contacts responsive to the receipt of the digit "2," NPS contacts 782 would open ground to control wiper 799, to thus prevent operation of test relay 705 even should an idle trunk be found. This would also apply to the third level, which is also blocked. Thus the correct code must be dialled for each suboffice before permitting access thereto.

In order for the subscriber at substation T1 to gain access to either Suboffice F or G as mentioned, the code digits "242" or "243" respectively must be dialled. Assuming, the subscriber at substation T1 desires to call a party in Suboffice F, the dialling of the first digit "2" will cause relays 340, 350, and 370 to be operated as before upon absorption of this dialled digit. Upon receipt of the next digit, the digit "4," the wipers 394–399 will step to the fourth level of bank contacts in a manner previously disclosed. Over this level, the wipers will search for an idle bi-level repeater linking a third selector. Assuming Bi-Level Repeater 600 (FIG. 6) is found idle, upon finding battery on the control conductor C605 via contacts 654, 674, and resistance battery. Upon seizure, Selector 300 will switch through in a manner previously described. Over the fourth level of bank contacts, the loop circuit will be extended over conductors C601 and C603 to operate relays 620 and 645 in series. The operation of relay 645 would as previously described extend a loop circuit to third Selector 700, and close a circuit to relay 650. The operation of relay 620 at contacts 621 closes ground over negative conductor C701 to Selector 700.

In third Selector 700, relay 735 will operate upon extension of the loop circuit thereto. Upon receipt of the ground pulse over negative conductor C701, the differential relay 730 will operate, closing at contacts 731 an obvious circuit to relay 720. Relay 720 operates, closing at contacts 721 a locking circuit for itself from ground at contacts 754. At contacts 723 the ground to control wiper 799 is opened.

The third digit, the digit "2," is dialled to intermittently open the loop to restore relays 620 and 645. Relays 610, 660, and 670 will operate upon the first restoration of relay 645, with relay 610 locking operated and slow-to-release relay 670 remaining operated during pulsing. The operation of relay 610 in this case, closes contacts 612 and 613 to shunt out relay 620 so that it cannot again operate to ground the line and its impedance will not interfere with pulsing. Relay 645 will thus repeat two digital impulses to Seletcor 700. The removal of ground from conductor C701 will restore differential relay 730, opening contacts 731 and the operating circuit to relay 720, however, relay 720 is locked operated and is not affected. Relay 735 upon receipt of the two repeated impulses will step the wipers 797—799 to the second level of bank contacts in a manner previously described. Upon the wipers being stepped to the second level, relay 760 restores and the NPS springs operate closing contacts 781 to again provide ground to control wiper 799. The restoration of relay 760 closes contacts 762 to complete a circuit to rotary magnet 770; the circuit extending from battery, winding of rotary magnet 770, contacts 771, 774, 746, 762, 718, 707, and 754 to ground. By means of its self-interrupter contacts 771, rotary magnet 770 self-interrupts its operating circuit to step the wipers 797—799 over the second level of bank contacts in search of an idle repeater. Assuming Repeater 58 is found idle by control wiper 799, test relay 705 will operate to stop rotary and close a circuit to relay 710 as before. Selector 700 will switch through in a manner previously described, with the exception that when relay 750 restores, contacts 754 also open the locking circuit to relay 720 which also restores.

The above description would also apply to the dialling of the third digit "3," with the exception that we would here rotate in search of a bi-level repeater extending to Suboffice G, such as Bi-Level Repeater 59. The remainder of the dialling to either Suboffice F or Suboffice G would be responded to by conventional or similarly described switches to complete the call, and further elucidations are not considered necssary.

It becomes quite obvious from the above description, that when Bi-Level Repeater 600 was seized from the fourth level by Selector 300 causing transmission of a ground to Selector 700 to operate relays 730 and 720, if any third digit other than digit "2" or "3" was dialled, the wipers 797—799 would rotate to the eleventh rotary position. Since relay 720 removed ground from control wiper 799 at contacts 723, and in order to replace ground thereon, the NPS springs must operate to close contacts 781 to close ground through, via contacts 722. However, the NPS springs will not operate on any level other than the second or third levels. Thus an incorrect third digit would cause the wipers to rotate to the eleventh rotary position to operate the cam springs whereby; cam contacts 772 open ground to relay 735 while closing cam contacts 773 to close busy tone to the calling party via conductor C785. Cam contacts 774 open the circuit to rotary magnet 770 to deenergize rotary magnet 770. Upon receipt of the busy tone, the calling party would hang up the receiver and release the equipment in a manner to be described.

Subscriber T1 could call a subscriber in Suboffice D by dialling the code 252, or Suboffice E by dialling code 253. In this case a bi-level repeater would be seized on the fifth level of bank contacts by Selector 300, such as Bi-Level Repeater 13 linking third Selector 43. Likewise, subscriber T1 could call a subscriber in Suboffice C by dialling the code 262. In this latter case a bi-level repeater would be seized on the sixth level of bank contacts by Selector 300, such as Bi-Level Repeater 14 linking third Selector 45.

Bi-Level Repeaters 13 and 14 are identical to Bi-Level Repeater 600 (FIG. 6) with a few minor differences. All three of these repeaters are accessed over a first path from different bank contacts on the second level of Selector 300, however, these repeaters are also accessed from different levels of the Selector 300 over a second path in these repeaters. More specifically, Repeater 13 is seized over its second path from the fifth level of Selector 300, and Repeater 14 is seized over its second path from the sixth level of Selector 300 to control the differential relay, like 730, so that thereafter the NPS springs must be operated to cause switch-through. Bi-Level Repeaters 13 and 14 are linked to third Selectors 43 and 45 respectively which are identical to Selector 700 with the exception that a different combination of outgoing trunks are accessed from these selectors. Selectors 43 and 45 upon their respective repeaters being seized over their respective first paths, have access to fourth selectors 48 and 49 from the seventh and eighth levels of bank contacts respectively of Selectors 43 and 45. However, when Repeater 13 seizes Selector 43 over its second path, only the second and third levels can be accessed which extend to Suboffice D and Suboffice E respectively. Third Selector 45 when seized over the second path through Repeater 14, permits only access to the second level of bank contacts extending to Suboffice C. The same blocking of levels as disclosed with respect to Selector 700 would also apply to Selectors 43 and 45, and in the case of Selector 45 would also block access to the third level when these selectors are seized over their respective second repeater paths. In this last mentioned case the NPS springs would not respond on the third level since there would be no corresponding code extending to a suboffice.

*Release*

Assuming first the release of the mentioned call between substations T1 and T3. Upon the termination of the call, the two parties will hang up their receivers to open the loop circuit to Connector 18 which restores under the control of the calling party in a well known manner. Connector 18 opens holding ground on its control conductor to cause the release of the switch train. In Selector 400, the holding ground removal restores relay 410 (FIG. 4). At contacts 417 relay 410 closes ground to release magnet 425, via contacts 422, 434, 442, winding of release magnet 425 to battery. Release magnet 425 energizes to restore the wipers 497, 498, and 499 to normal, which, in turn, restores the VON springs to normal, opening at VON contacts the energizing circuit to release magnet 425. Combination third and fourth Selector 400 is now at normal.

The holding ground on control conductor C403 of Selector 400 is also removed to restore either relay 320 or 330 (depending upon which one was operated). In either case, the restoration of one of these relays would close a ground to release magnet 315 at contacts 328 or 338, via contacts 342, 349, 359 winding of release magnet 315 to battery. Release magnet 315 energizes to restore the wipers 394—399 to normal, to in turn restore the VON springs to normal, opening at VON contacts 359 the energizing circuit to release magnet 315. Combination first and second Selector 300 is now at normal. Also, the removal of ground from control conductor C303 will release Finder 12 and Line Circuit 10 in a well known manner.

Assuming next the termination of the call between substations T1 and T4, Connector 31, fifth Selector 29, fourth Selector 30, and Repeater 15 would release in a conventional manner. In contrast to the above-mentioned restoration of Selector 400, it is to be recalled that in this case Selector 400 acted as a third Selector instead of a third and fourth Selector. Therefore, the NPS2 springs would also restore in conjunction with the above described release of Selector 400.

Assuming next the termination of the call between substations T1 and T6 or T7, Connectors 52 or 53 release in a conventional manner, to remove holding ground from their respective control conductors to cause the release of Selector 50 or 51, and Selector 48 or 49. The removal of the holding ground causes relay 710 in third Selector 700 to restore, to in turn close contacts 717 to close a circuit to release magnet 725 via contacts 737, 753, and 743. Release magnet 725 energizes to restore the wipers 797, 798, and 799 to normal, to restore the VON springs opening VON contacts 743 to deenergize the release magnet 725. Selector 700 is now in its normal position. In Bi-Level Repeater 600 (FIG. 6), the opening of the called subscriber loop circuit to polar relay 640 causes restoration thereof. The restoration of relay 640 opens contacts 641 and the circuit to relay 630. When the calling subscriber hangs up the calling subscriber loop is opened to relay 645. Relay 645 restores, opening at contacts 647 the circuit to relay 650. Relay 650 restores after a short delay, and at contacts 653 disconnects ground from conductor C605 or C606 to open the locking circuit of relay 610 and to cause the release of the preceding switches. Relay 630 restores to avail Bi-Level Repeater 600 for future seizure. Selector 300 will release in a manner previously described.

The release of previously mentioned extended calls would include above-mentioned or similar switches, and furthr elucidation is not considered necessary.

OUTGOING CALLS FROM SUBOFFICE B

In regards to calls from Suboffice B, and more particularly from substation T2, the equipment used herein is identical to Suboffice A. A few modifications appear in this suboffice in comparison with Suboffice A, since these two suboffices have different codes or prefix digits. However, Line Circuit 21, Finder 22, and Selector 23 are identical in every respect to Line Circuit 10, Finder 12, and Selector 300 respectively. Combination third and fourth Selector 24 is identical to Selector 400 with the slight change in the operation of the normal post springs. In Selector 24, the NPS2 springs would operate on the second level instead of the third level as in Selector 400 (FIG. 4). Likewise, the NPS1 springs would operate on the third level instead of the second level as in Selector 400. Therefore, in order for the subscriber at T2 to make a local call to substation T4, the first three digits must be "233." Likewise, in order for the subscriber at substation T2 to call substation T3 in Suboffice A, the first three digits "232" must be dialled to seize a repeater, such as 28 linking Selector 17 extending to Suboffice A.

Bi-Level Repeaters 25, 26, and 27 are identical to Repeaters 600, 13, and 14 respectively and need no further explanation. Those repeaters are linked with third Selectors 41, 42, and 44, which in turn are multipled with the banks of Selectors 700, 43, and 45 respectively.

CALLS FROM MAIN EXCHANGE M

In regards to calls from the Main Exchange M, and more particularly from Substation T5, certain equipment herein is identical to that in Exchange A. Combination first and second Selector 47 is identical to Selector 300 with the exception that a local combination third and fourth selector is seized from the second level of bank contacts to correspond with the code of Main Exchange M.

Assuming that the subscriber at Substation T5 desires to call subscriber T7 in the same exchange, the lifting of the receiver will seize Line Circuit 65, Finder 46, and Combination first and second Selector 47. Assuming the calling subscriber dials the first two digits "22" into Selector 47, this selector will seize a combination third and fourth selector in a manner previously described for Selector 300. It will be assumed that Combination third and fourth Selector 800 (FIG. 8) is seized by Selector 47 upon finding battery on control conductor C803 via the winding of relay 835. Selector 47 will switch through in a manner described with respect to Selector 300.

Upon the seizure of Selector 800 (FIG. 8), relay 835 operates. Selector 47 closes a loop circuit to operate relay 820; the circuit extending from battery, upper winding of relay 820, contacts 811, negative conductors C801, back over the calling loop, positive conductor C802, contacts 813, lower winding of relay 820, cam contacts 862 to ground. At contacts 836, relay 835 opens a prepared locking circuit to relay 840. Contacts 837 close to prepare a circuit to vertical magnet 830. Relay 820 operates, closing contacts 821 and an obvious circuit to relay 825. Relay 825 operates, closing contacts 826 to hold the preceding equipment and maintain relay 835 operated. Contacts 827 close to prepare circuits to relays 840, 850, 810, and rotary magnet 860. Contacts 828 close to further prepare a circuit to vertical magnet 830.

Upon receipt of the next dialled digit, the digit "7," relay 820 will intemittently restore seven times. Each restoration of relay 820 will open at contacts 821 the circuit to relay 825. However, relay 825 is slow-to-release and remains operated throughout the impulse series. At contacts 822 a circuit is intermittently closed to vertical magnet 830 which will thus intermittently energize and deenergize to step the wipers 894, 895, 896, 897, 898, and 899 one step for each energization. Upon the wipers stepping off-normal, the VON springs will operate whereby; VON contacts 831 close to prepare a circuit to rotary magnet 860; VON contacts 832 close to prepare a circuit to release magnet 824; VON contacts 833 open the circuit to relay 835. However, VON contacts 834 close to maintain relay 835 operated in series with vertical magnet 830 during pulsing.

At the termination of the series of seven impulses vertical magnet 830 and slow-to-release relay 835 restore.

The wipers 894—899 are opposite the seventh level of bank contacts operating the normal post springs NPS1, closing NPS1 contacts 881 and an obvious circuit to relay 840. Relay 840 operates, closing contacts 841 without effect on this level. Contacts 842 close an obvious locking circuit for relay 840. Contacts 843 close to prepare a circuit to release magnet 824. Contacts 844 close a circuit to relay 850; the circuit extending from battery, winding of relay 850, contacts 844, 838, 818, 807, 831, and 827 to ground. Contacts 845 open the prepared circuit to rotary magnet 860. Relay 850 operates, closing contacts 851 without effect on this level. Contacts 852 open the original operating circuit to relay 840. However, relay 840 remains operated over its mentioned locking circuit. Contacts 853 close an obvious locking circuit for relay 850. Contacts 854 close an obvious circuit to release magnet 824. Contacts 855 close ground to control wiper 898 via the winding of test relay 805 and contacts 875. Release magnet 824 energizes to restore the wipers 894—899 to normal to in turn restore the VON springs and the NPS1 springs to normal. VON contacts 832 open to deenergize the release magnet 824. VON contacts 833 close to again operate relay 835. The reoperation of relay 835 at contacts 836 opens the locking circuit to relay 840. Relay 840 restores. Thus, the third digit, the digit "7" is absorbed by Selector 800.

The fourth digit to be dialled can be any digit, and upon receipt thereof relay 820 will again intermittently restore the number of times corresponding to the digit dialled. Assuming, for instance the digit "7" again dialled, the vertical magnet 830 will step the upper level wipers to the seventh level. At the end of the digital impulse series, vertical magnet 830 and slow-to-release relay 835 will restore as before. On the seventh level of bank contacts, the NPS1 springs will operate, closing NPS1 contacts 881. However, in this case operated relay 850 has contacts 852 opened to prevent the operation of relay 840. Instead, a circuit is now closed to rotary magnet 860; the circuit extending from battery, winding of rotary magnet 860, contacts 861, 864, 845, 838, 818, 807, 831, and 827 to ground. By means of its self-interrupting contacts 861, rotary magnet 860 will intermittently open its operating circuit to step the wipers over the seventh level of bank contacts in search of an idle fifth selector.

Assuming that no idle fifth selector was found during rotation of the wipers, the wipers would self-interruptedly step to the eleventh rotary position. On the eleventh rotary position, the cam springs would operate whereby cam contacts 862 open ground through the lower winding of relay 820 and at cam contacts 863 places busy tone from conductor C804 on the loop; cam contacts 864 open the circuit to rotary magnet 860 to cause deenergization thereof. Upon receipt of the busy tone the calling party will hang up the receiver to release the equipment in a manner to be described in the ensuing description.

Assuming that during rotation of wipers 894—899 the fifth Selector 51 is found idle, battery will be contacted by control wiper 898 to operate test relay 805. At contacts 807 relay 805 opens the circuit to rotary magnet 860 to cause deenergization thereof. Contacts 806 close a circuit to relay 810 via contacts 831 and 827. Relay 810 operates opening, at contacts 811 and 813, the circuit to relay 820. Contacts 812 and 814 close the loop circuit to fifth Selector 51 via contacts 871 and 873, and wipers 894 and 896. At contacts 815 and 816 a locking circuit is closed to relay 810 from Selector 51 which grounds control wiper 898 in a well known manner. Contacts 817 open the circuit to relay 825, and contacts 818 further open the circuit to rotary magnet 860. Relay 820 restores to further open the circuit to relay 825. Relay 825 restores opening at contacts 827 the locking circuit to relay 850. Relay 850 restores opening contacts 855 to open the circuit to relay 805 which restores.

The fifth digit will thus be dialled into fifth Selector 51 to seize a connector, such as Connector 53. Selector 51 and Connector 53, being of conventional design, will complete the call to substation T7 in a well-known manner responsive to the receipt of the remaining dialled digits.

Assuming that Substation T5 desires to call Substation T6; Line Circuit 65, Finder 46, Selector 47, and Selector 800 will be seized in the manner described. In this case, however, the third digit dialled must be the digit "8." Upon receipt of the eight digital impulses, relay 820 will intermittently restore to pulse vertical magnet 830 in a manner previously described. The wipers 894—899 will thus be stepped to the eighth level of bank contacts, and vertical magnet 830 and slow-to-release relay 835 will restore as before. On the eighth level of bank contacts both sets of normal post springs will operate whereby NPS1 contacts 881 will close a circuit to operate relay 840, which in turn closes a circuit to operate relay 850 as before described; and NPS2 contacts 882 close a circuit to relay 870 via contacts 851, 841, and 826 to ground. Relays 840 and 850 lock operated as before, and close a circuit to release magnet 825. Relay 870 operates, opening contacts 871, 873, and 875 to disconnect the upper level wipers, and closes contacts 872, 874, and 876 to prepare the lower level of wipers for utilization, including the extension of ground from contacts 855 to control wiper 899. Contacts 877 close a locking circuit for relay 870 from ground at contacts 826. Release magnet 824 energizes to restore the wipers 894—899 to normal, to in turn restore the normal post springs and vertical off-normal springs to normal. Release magnet 824 restores as before described. The NPS2 contacts 882 open; however, relay 870 locked operated and is unaffected. Thus, the third digit "8" is absorbed.

The fourth digit following the third digit "8" can be any digit, and will cut through in a manner previously described with the exception that the lower level of bank contacts will be used to find an idle fifth selector. The remainder of the dialled digits will be assumed to switch through fifth Selector 50 and Connector 52 in a conventional manner to ring Substation T6.

Assuming that the subscriber at Substation T5 inadvertently dialled any third digit other than "7" or "8" into Selector 800, neither set of normal post springs would operate. Since the normal post springs would not operate, no circuit would be closed to relay 850 which controls the ground on the control wipers at contacts 855. For instance, after dialling, the vertical magnet 830 and slow-to-release relay 835 would restore. At contacts 838 a circuit is closed to rotary magnet 860 over a previously traced circuit. Rotary magnet 860 would rotate the wipers over the level dialled. However, even should an idle fifth selector be encountered by control wiper 898, test relay 805 would not operate to initiate the cut-through because contacts 855 are not closed. The wipers would thus rotate to the overflow position to return busy tone. Thus, again the correct code or prefix digits must be dialled in order to reach a party in the main exchange.

Assuming that the subscriber at Substation T5 desires to call Substation T3 in Suboffice A; Line Circuit 64, Finder 46, and Selector 47 will be seized as before. The office code for Suboffice A as mentioned is "232" which must be dialled. Selector 47 is identical to Selector 300 and needs no further explanation, except that it will seize Bi-Level Repeater 60 linking Combination third and fourth Selector 500 (FIG. 5) upon dialling the first two digits "23" in a manner similarly described with respect to Selector 300. Bi-Level Repeater 60 is identical to Repeater 600, and it will be understood that when seized over level three by Selector 47 it will be the level that forwards ground to Selector 500 to cause the operation of differential relay 525.

Upon the seizure of Selector 500 (FIG. 5) via Bi-Level Repeater 60, relays 525 and 530 will operate; the circuit extending from battery, upper windings of relays 530 and 525, contacts 511, negative conductor C501, to ground in Repeater 60. This ground connection being similar to ground at contacts 621 which grounds conductor C501 to unbalance the loop extended from Repeater 60. Relay 525 being of the differential type will operate over this circuit from the ground forwarded over conductor C501. At contacts 531, relay 530 closes an obvious circuit to relay 540. Relay 540 operates, closing at contacts 541 an obvious circuit to relay 550. Contacts 542 close to prepare circuits to relays 570 and 565. Contacts 543 close to prepare a circuit to vertical magnet 560. Contacts 545 close ground to control wiper 599. Relay 525 operates, closing at contacts 526 a circuit to relay 520 via contacts 576 and 542 to ground. Relay 550 operates closing contacts 552 to further prepare a circuit to vertical magnet 560. Relay 520 operates, closing contacts 521 to prepare a circuit to relay 570. Contacts 522 close an obvious locking circuit to relay 520. Contacts 524 open ground to control wiper 599, and contacts 523 close to prepare said ground to control wiper 599 via a different path.

Upon receipt of the third digit of the office code, the digit "2," Repeater 60 will repeat the series of two impulses to relay 530 and remove ground from conductor C501 to restore differential relay 525. Relay 530 will intermittently restore and operate two times, to intermittently close at contacs 532 a circuit to vertical magnet 560. The last-mentioned circuit extending from battery, winding of vertical magnet 560, contacts 552, 543, 532, and 517 to ground. Vertical magnet 560 will intermittently energize and deenergize to vertically step the wipers 597, 598, and 599 one step for each energization. Upon the wipers stepping off-normal, the VON springs will operate whereby; VON contacts 561 and 562 close to bypass differential relay for a better pulsing of relay 530; VON contacts 563 close to prepare a circuit to relay 510; VON contacts 564 close to prepare a circuit to release magnet 529; VON contacts 565 open the circuit to relay 550. However, VON contacts 566 close a circuit to maintain relay 550 operated in series with vertical magnet 560 during pulsing. Relay 525 restores opening contacts 526 without affecting relay 520, since relay 520 locked operated.

At the termination of the third digital impulse series, vertical magnet 560 will completely deenergize, and after a short duration slow-to-release relay 550 restores. The wipers 597—599 will be on the second level of bank contacts which operates the NPS2 springs. NPS2 contacts 592 close ground to control wiper 599 via contacts 523 and 545 and through test relay 505. The restoration of relay 550 closes a circuit to rotary magnet 580; the circuit extending from battery winding of rotary magnet 580, contacts 581, 584, 574, 553, 518, 507, 563, and 542 to ground. Rotary magnet 580 by means of its self-interrupter contacts 581 will rotate the wipers 597—599 over the second level of bank contacts in search of an idle repeater connected to Suboffice A.

Assuming that Repeater 28 is found idle by Selector 500, battery will be returned over C wiper 599 to operate test relay 505. At contacts 507, relay 505 opens the circuit to rotary magnet 580 to stop rotation of the wipers. Contacts 506 close a circuit to relay 510; the circuit extending from battery, winding of relay 510, contacts 506, 563, 542, to ground. Relay 510 operates, opening contacts 511 and 513 and the circuit to relay 530. Contacts 512 and 514 close to extend the loop circuit from Repeater 60 to Repeater 28 via wipers 597 and 598. Contacts 515 and 516 close a locking circuit to relay 510 upon ground being returned over the control lead from repeater 28 in a well-known manner. Contacts 517 open the circuit to relay 540. Contacts 518 further open the circuit to rotary magnet 580. Relays 530 and 540 restore, to in turn restore relay 505.

Repeater 28 being of conventional design, and being linked with fourth Selector 17 also of conventional design, will receive the fourth digit and repeat it to Selector 17. It will be assumed that the remaining digits will seize fifth Selector 16 and connector 18 to ring Substation T3 in a well-known manner.

Assuming that Substation T5 desires to call a subscriber at Substation T4 in Suboffice B, the office code digits "233" must first be dialled. It will be assumed that Line Circuit 65, Finder 46, Selector 47, Bi-Level Repeater 60, and Selector 500 (FIG. 5) are utilized upon dialling the first two digits "23" in a manner above-described. In Selector 500 (FIG. 5), relays 520, 525, 530, 540, and 550 will operate upon seizure as before described.

Upon receipt of the third digit, the digit "3" relay 530 will restore three times to pulse vertical magnet 560 and step the wipers 597—599 in a manner previously described. At the termination of the impulse series relays 525, 550, and vertical magnet 560 will have restored as before described. The wipers in this case will be opposite the third level of bank contacts, and the NPS1 springs will operate to close a circuit to relay 570; the circuit extending from battery, winding of relay 570, contacts 521, NPS1 contacts 594, contacts 563, and 542 to ground. It is to be understood that relay 570 operated before relay 550 restored due to the slow-to-release characteristics of relay 550, and at contacts 571 relay 570 will lock operated when relay 550 restores to close contacts 551. Contacts 572 close to prepare a circuit to release magnet 529. At contacts 573 a circuit is closed to relay 575; the circuit extending from battery, winding of relay 575, contacts 573, 553, 518, 507, 563, and 542 to ground. Contacts 574 open a prepared circuit to rotary magnet 580. Relay 575 operates, opening at contacts 576 the locking circuit to relay 520. Contacts 577 close a locking circuit to relay 575 via contacts 563 and 542 to ground. Contacts 578 close ground to release magnet 529 via contacts 572, 553, and 564. Relay 520 restores, opening the original operating circuit to relay 570. However, relay 570 remains operated over its locking circuit. Release magnet 529 energizes to restore wipers 597, 598, and 599 to normal, to in turn restore the VON springs and NPS1 springs. VON contacts 561 and 562 open to remove the shunt from differential relay 525. However, relay 525 will not operate because ground no longer appears on conductor C501 from Bi-Level Repeater 60. VON contacts 563 open the locking circuits to relays 570 and 575. VON contacts 565 close a circuit to reoperate relay 550. VON contacts 564 open to deenergize release magnet 529. NPS1 contacts 594 open to further open the circuits to relays 570 and 575. Relays 570 and 575 restore. Selector 500 has thus absorbed the third digit and is now prepared to act as a fourth selector upon receipt of the fourth digit.

The fourth digit to be dialled may be any digit other than digit "2." In the event that the digit "2" is inadvertently dialled, the NPS2 contacts 592 would close. However, as mentioned, relay 520 has restored and the circuit for test relay 505 is opened at contacts 591 to prevent its operation during rotation of the wipers regardless of whether or not an idle trunk is found. The wipers would therefore rotate to the overflow position and return busy tone.

If the calling subscriber dialled thet digit "3" again, as the fourth digit, the Selector 500 will cut-through. In this case, since ground on conductor C501 would no longer be present, relays 525 and 520 would not operate. Therefore, when the wipers are stepped to the third level of bank contacts, the closing of the NPS1 contacts 594 would be ineffective, and relay 570 could not operate due to its operating circuit being opened at contacts 521. Furthermore, since relay 570 did not operate the rotary circuit is not opened, and the wipers would be free to rotate over the third level of bank contacts in search of an idle fifth selector. Any fourth digit other than "2" would also operate Selector 500 in this manner.

Assuming that Selector 500 finds an idle fifth selector such as 29, control wiper 599 would engage battery to operate test relay 505 via contacts 591, 524, and 545 to ground. At contacts 507, relay 505 opens the circuit to rotary magnet 580 to stop rotation of the wipers. Contacts 506 close ground to relay 510 via contacts 563 and 542. Relay 510 operates to switch the call through to Selector 29 in a manner previously described. The remainder of the digits dialled will be assumed to operate Selector 29 and connector 31 to ring Substation T4 in a well-known manner.

In regards to Combination third and fourth Selector 500, when seized by Selector 47 via Repeater 60, the attempted dialling of any third digit other than digits "2" or "3" will be blocked. Upon seizure of Selector 500, relays 520, 525, 530, 540 and 550 will be operated as before mentioned. Assuming that the third digit dialled is the digit "4," relay 530 will intermittently restore to intermittently energize vertical magnet 560 four times in a manner previously described. At the termination of the impulse series, vertical magnet 560 and relay 550 restore, and relay 525 will have restored. The wipers being opposite the fourth level of bank contacts will have no effect on the normal post springs. With relay 520 locked operated, contacts 524 have ground opened to control wiper 599 to prevent the operation of test relay 505 during rotation of the wipers, regardless of whether an idle trunk is found or not. Therefore, the wipers would rotate to the overflow position and return busy tone to the calling subscriber. The calling party would then proceed to hang up to release the equipment in a manner to be described.

*Release*

The termination of the mentioned call between Substations T5 and T7 will cause the release of connector 53 and the removal of ground from the control conductor in a conventional manner upon the parties hanging up their receivers. When holding ground is removed from the control conductor, relay 810 in Selector 800 restores. Contacts 817 close ground to release magnet 824 via contacts 822, 829, and 832. Release magnet 824 energizes to restore the wipers 894–899 to normal. The VON springs and the normal post springs, if operated, restore to open the circuit at VON contacts 832 to release magnet 824, causing deenergization thereof. Selector 47, Finder 46, and Line Circuit 65 will restore in response to the connector removing ground from the control conductor in the conventional manner.

The release of a terminated call between Substations T5 and T6 will take place in a manner similarly described above and requires no further elucidation.

The termination of the mentioned call between Substations T5 and T3, will cause the release of the switch train including Repeaters 60 and 28 in a conventional manner when the calling and called parties hang up their receivers. The release of Repeater 28 will remove ground from the control conductor therein to restore relay 510 in Selector 500. Contacts 517 close ground to release magnet 529 via contacts 532, 544, and 564. Release magnet 529 energizes to restore wipers 597, 598, and 599 to normal. The VON springs and NPS2 springs restore, opening at VON contacts 564 the circuit to release magnet 529 causing deenergization thereof. Combination third and fourth Selector 500 is now at normal. The opening of the loop circuit by the calling Subscriber T5 will restore Bi-Level Repeater 60 on a manner described with respect to Repeater 600 (FIG. 6). Selector 47, Finder 46, and Line Circuit 65 will release in a conventional manner in response to Repeater 60 removing holding ground from its control conductor.

Regarding the termination of the mentioned call between Substations T5 and T4, the equipment utilized will restore in a manner similarly described above and requires no further elucidation.

*Other calls*

Assuming a call is initiated in Suboffice E (not shown) and the calling party desires to call Substation T3 in Suboffice A, the calling party must first dial the first three digits of the office code. As previously mentioned all calls from the suboffices to other suboffices must go through the main exchange, with the exception of certain adjacent suboffices such as Suboffices A and B, which, as described, can be dialled direct. In the present case, the dialling of the first two digits "23" by a subscriber in Suboffice E will cause the suboffice switches to seize third Selector 54 in Main Exchange M. The third Selector 54 is similar to Selector 700 (FIG. 7) and will respond in a manner previously described to the third code digit "2" to seize Repeater 61. Repeater 61 is linked with fourth Selector 19 in Suboffice A. The remainder of the call will be assumed handled in a conventional manner via fifth Selector 16 and Connector 18 upon receipt of the remainder of the digital impulses.

Assuming that the subscriber in Suboffice E desires to call Substation T4, third Selector 54 will be seized as above upon dialling the digits "23." In this case, the third digit will be "3," and Selector 54 will seize a Bi-Level Repeater such as 60 on its third level of bank contacts. The seizure of Bi-Level Repeater 60 on this level will not forward ground to the linked combination third and fourth Selector 500 (FIG. 5). Therefore, differential relay 525 will not operate in this case upon extending the loop hereto.

It is to be noted here that Selector 500 was seized by a third selector. Therefore, Selector 500 must respond as a fourth selector in this case. Upon seizure, relays 530, 540 and 550 will operate as before mentioned. The operation of relay 540 at contacts 545 will ground control wiper 599 via the winding of test relay 505, contacts 591 and 524.

Upon receipt of the fourth digit (any digit other than the digit "2"), relay 530 will intermittently restore responsive to the digital impulses. Vertical magnet 560 will respond to the intermittent restoration of relay 530 over a circuit from ground, contacts 517, 532, 543, 552, winding of vertical magnet 560 will thus intermittently energize to step the wipers 597–599. At the end of impulse series vertical magnet 560 will deenergize and after a short duration slow-to-release relay 550 restores. A circuit is now closed to rotary magnet 580; the circuit extending from battery, winding of rotary magnet 580, contacts 581, 584, 574, 553, 518, 507, 563, 542 to ground. By means of its self-interrupter contacts 581, rotary magnet 580 will rotate the wipers over the level of bank contacts vertically stepped to . Upon the control wiper encountering battery to designate an idle fifth selector, test relay 505 will operate. The operation of test relay 505 opens the rotary circuit at contacts 507 and closes a circuit to relay 510 at contacts 506 in a manner previously described. Relay 510 will thus operate and extend the call through in a manner previously described. The call will thus be further extended to Substation T4 in a conventional manner previously mentioned.

Had the calling party in the above-mentioned call inadvertently dialled the digit "2" as the fourth digit, when the wipers vertically stop on the second level the NPS2 springs would operate. At NPS2 contacts 591 the ground to control wiper 599 would thus be open, and the wipers would rotate to the eleventh rotary position because test relay 505 would not operate when an idle fifth selector is encountered. Instead, the calling party would receive busy tone by way of cam contacts 583. This prevents Selector 400, while acting as a fourth selector, from seizing another fourth selector such as Selector 17. This also acts as a block to Suboffice A when an incorrect office code has been dialled.

FIG. 9 is a modification of FIG. 3 (Combination first and second Selector 300). FIG. 9 is a Combination first, second and third Selector 900 and could be utilized in the place of FIG. 3 upon modifying the trunking system slightly. This selector permits a partial or complete code to be dialled directly into it for absorption and extension. It also will block incorrect codes inadvartently dialled and will permit cut-in on special service single digit calls. Selector 47 in Main Exchange M is also identical to Selector 300 (FIG. 3), and for description purposes Selector 900 (FIG. 9) will be assumed to be located in its place.

Assuming first a special service call such as a toll call and, when the calling party lifts the receiver, a finder will seize the corresponding line circuit in a well-known manner. The calling loop will thus be extended to operate relay 920; the circuit extending from battery, upper winding of relay 920, contacts 911, negative conductor C901, back over the loop, positive conductor C902, contacts 913, lower winding of relay 920, contacts 952, 974, conductor C970 to dial tone and ground. Relay 940 operates from ground forwarded over the control conductor C903 from the finder. Contacts 942 close to prepare a circuit to vertical magnet 945. Contacts 943 open a prepared circuit to rotary magnet 950. Relay 920 operates, closing at contacts 921 an obvious circuit to relay 930. Relay 930 operates, closing at contacts 931 an obvious holding circuit to relay 940 and grounds control conductor C903 to hold the preceding equipment. Contacts 932 close preparing circuits to relays 910, 960, release magnet 919, and motor magnet 990. Contacts 933 close to further prepare a circuit to vertical magnet 945. Contacts 935 close ground to the first and tenth bank contacts on vertical bank 980 via contacts 972.

Upon receipt of the digital impulses when the calling party dials the digit "0," relay 920 will intermittently restore. Upon the first restoration of relay 920 a circuit is closed to vertical magnet 945; the circuit extending from battery, winding of vertical magnet 945, contacts 942, 933, 922, and 917 to ground. Relay 930 being slow-to-release will remain operated during the intermittent opening of contacts 921. Vertical magnet 945 will thus energize to step the wipers 997, 998, and 999 and vertical wiper 981 of vertical bank 980 one step for each energization. Upon the wipers taking the first step, the VON springs will operate whereby: VON contacts 946 close to prepare a circuit to rotary magnet 950; VON contacts 947 close to prepare a circuit to release magnet 919; VON contacts 948 open the operating circuit to relay 940. However, relay 940 is maintained operated in series with vertical magnet 945 during pulsing via closed VON contacts 949. Vertical magnet 945 will thus proceed to step the wipers 997—999 and 981 to the tenth level of bank contacts responsive to the receipt of ten impulses via contacts 922.

At the termination of the digital impulse series, relay 940 will restore after a short duration, vertical magnet 945 will have been completely deenergized, and relay 920 will reoperate. The vertical bank wiper 981 being on the tenth vertical bank contact will provide ground to control wiper 999 via contacts 935, the normally operated S1 spring contacts 972, tenth bank contact and wiper 981, and through the winding of test relay 905. The restoration of relay 940 closes a circuit to rotary magnet 950 via contacts 951, 954, 965, 943, 918, 907, 946, and 932 to ground. By means of its self-interrupter contacts 951, rotary magnet 950 will rotatively step the wipers 997—999 over the tenth level of bank contacts in search of an idle toll trunk. Upon the wipers taking their first rotary step, the RON springs operate closing RON contacts 959 to prepare a homing circuit to motor magnet 990. It is to be understood that the above-mentioned operations would be the same for the dialling of the digit "1" for special service calls, because the first and tenth bank contacts on vertical bank 980 are multipled.

Assuming that a toll trunk is found idle, control wiper 999 would engage battery to operate test relay 905. At contacts 907 relay 905 opens the rotary circuit to stop rotation of the wipers. Contacts 906 close a circuit to relay 910 via contacts 946 and 932 to ground. Relay 910 operates opening, at contacts 911 and 913, the circuit to relay 920. At contacts 912 and 914 the loop circuit is extended to the seized toll trunk via negative conductor C901 and wiper 997, and positive conductor C902 and wiper 998. Contacts 915 and 916 close to lock relay 910 operated from a ground extended over the control conductor from the extended connection; holds the preceding equipment by interconnecting the control conductors; and shunts out relay 905. Contacts 917 open the circuit to relay 930 and opens prepared circuits to release magnet 919 and motor magnet 990. Contacts 918 further open the circuit to rotary magnet 950. Relay 905 restores. Relays 920 and 930 restore. The remainder of the call will thus be handled via the seized toll trunk in a conventional manner.

In the event that no idle toll trunk was found during rotation of the wipers, the wipers would rotate to the overflow position to operate the cam springs whereby: cam contacts 952 opens ground to relay 920 and closes busy tone therethrough via cam contacts 953 to notify the calling subscriber of the all trunks busy condition; cam contacts 954 open the circuit to rotary magnet 950. The calling subscriber would then hang up to release the equipment in a manner to be described.

Assuming next a local call within Exchange M, which will require the code "227" or "228" to be dialled as previously mentioned. In this case Selector 900 will respond as a first and second selector by absorbing the first digit "2" and switching through on the second digit "2".

Upon seizure of Selector 900, relays 920, 930, and 940 will operate as before. Upon receipt of the first digit "2," vertical magnet 945 wil respond, as before described, to step the wipers 997, 998, 999 and 981 to their respective second levels. At the termination of the impulse series relay 940 and vertical magnet 945 restore as before described. When the wipers are raised to the second level of bank contacts, the NPS1 springs operate to close a circuit to relay 960; the circuit extending from battery, winding of relay 960, NPS1 contacts 979, S1 contacts 971, contacts 932 to ground. Relay 960 operates closing a locking circuit for itself when slow-to-release relay 940 eventually restores via contacts 961, 941, and 932 to ground. Contacts 965 open the prepared circuit to rotary magnet 950. Contacts 962 and 964 close circuits to release magnet 919 and motor magnet 990; the first circuit extending from ground, contacts 932, 946, 907, 918, 943, 964, 947, winding of release magnet 919 to battery; and the second circuit including contacts 962, winding of motor magnet 990 to battery. Motor magnet 990 will energize. Release magnet 919 will energize to restore the wipers 997, 998, 999, and 981 to normal to restore the VON springs, and the NPS1 springs whereby: VON contacts 946 open the circuit to release magnet 919 and motor magnet 990; VON contacts 948 close to reoperate relay 940; and NPS1 contacts 979 open the original operating circuit to relay 960. Motor magnet 990 deenergizes to advance the cams to operate the S2 springs and restore the S1 springs. The reoperation of relay 940 opens, at contacts 941, the locking circuit to relay 960 to cause restoration thereof. The restoration of the S1 springs opens contacts 971, and contacts 972 open to remove ground from the first and tenth bank contacts on vertical bank 980. S1 contacts 974 open dial tone and ground from the lower winding of relay 920. However, S1 contacts 973 close ground to maintain relay 920 operated. The operation of the S2 springs prepares a circuit to relay 960 by closing S2 contacts 985. S2 contacts 986 close ground via contacts 935 to the second, fourth, fifth, and sixth bank contacts of vertical bank 980.

The calling subscriber will proceed to dial the next digit "2", whereby relay 920 will again intermittently restore and operate two times to pulse vertical magnet 945. The wipers will again lie adjacent the second level of bank contacts, and relay 940 and vertical magnet 945 will restore. The NPS1 contacts will again close, however, the circuit to relay 960 is open at S1 contacts 971 to prevent operation thereof. Therefore, the rotary circuit is closed via battery, winding of rotary magnet 950, contacts 951, 954, 965, 943, 918, 907, 946, and 932 to ground. Also, the ground on the second bank contact of vertical bank 980 via 935 and 986 is forwarded to control wiper 999 via wiper 981 and the winding of test relay 905. Rotary magnet 950 by means of its self-interrupter contacts 951 will rotatively step the wipers 997—999 over the second level of bank contacts in search of an idle third selector. When a third selector is found, test relay 905 will operate to initiate the cut-through in a manner previously described.

Had the second digit been a "4," "5," or "6" the same operations as above-described would have taken place since these levels on the vertical bank 980 are all multipled. These second digits, however, represent the codes of three different suboffices and would hunt for repeaters extending thereto on their respective levels.

Assuming next a call to a subscribed in Suboffice B with the office code 233. The dialling of the first digit, the digit "2," Selector 900 will respond as above-described to cause absorption thereof to open the S1 springs and close the S2 springs. Upon receipt of the second digit, the digit "3," relay 920 will respond to pulse vertical magnet 945 to step the wipers to the third level of bank contacts in a manner described. On this level of bank contacts the NPS2 springs will operate to close a circuit to relay 960 via NPS2 contacts 989, S2 contacts 985, and contacts 932 to ground. Relay 960 operates and when slow-to-release relay 940 restores, a locking circuit is closed to relay 960 via contacts 961, 941, and 932 to ground. Contacts 965 open the prepared circuit to rotary magnet 950. Contacts 962 and 964 close a circuit to motor magnet 990 and release magnet 919; the first circuit extending from ground, contacts 932, 946, 907, 918, 943, 964, 947, winding of release magnet 919 to battery, and the second circuit including contacts 962, winding of motor magnet 990 to battery. Motor magnet 990 energizes. Release magnet 919 energizes to restore the wipers to their normal position to restore the VON springs, and the NPS2 springs. VON contacts 946 open the circuits to release magnet 919 and motor magnet 990; VON contacts 948 reclose the circuit to reoperate relay 940; and NPS2 contacts 989 open the original operating circuit to relay 960. Motor magnet 990, upon deenergization, steps to transfer to the third set of cams to operate the S3 springs and restore the S2 springs. The operation of the S3 springs closes S3 contacts 995 to place ground from contacts 935 to the third, seventh, eighth, and ninth bank contacts of vertical bank 980. The reoperation of relay 940 opens the locking circuit to relay 960 at contacts 941, to cause restoration thereof.

Upon receipt of the third digital impulse series, the digit "3," relay 920 will again respond to pulse vertical magnet 945 to step the wipers to their respective third level of bank contacts. At the termination of the impulse series, relay 940 and vertical magnet 945 restore as before mentioned. On the third level of bank contacts the wipers will again operate the NPS2 springs however, without affecting relay 960 since its operating circuit is now opened at S2 contacts 985. The ground on the third bank contact of vertical bank 980 is now forwarded to control wiper 999 via wiper 981 and the winding of test relay 905. The restoration of relay 940 closes a circuit to rotary magnet 950 via battery, winding of rotary magnet 950, contacts 951, 954, 965, 943, 918, 907, 948, and 932 to ground. By means of its self-interrupter contacts 951, rotary magnet 950 will rotarily step the wipers 997—999 over the third level of bank contacts in search of an idle repeater extending to Suboffice B. When an idle repeater is found test relay 905 will operate to initiate the cut-through in a manner previously described. In this case the incoming selector in Suboffice B will operate as a fourth selector and the remainder of the call will be handled in a conventional manner.

Assume next the inadvertent dialling of an incorrect first office code digit (any digit other than 1, 2, or 0). Assuming the calling subscriber dials a first digit such as the digit "4" into Selector 900, Selector 900 will respond in a manner described to step the wipers to the fourth level of bank contacts. Relay 940 will restore as before. The rotary circuit to rotary magnet 950 is closed. However, no ground appears on vertical wiper 981 to operate test relay 905 should an idle trunk be found. Therefore, the wipers would rotate to the overflow position and return busy tone in a manner previously described.

The above-described overflow rotation of wipers would also apply to inadvertent dialling of incorrect second or third digits. For instance, assuming the first digit "2" has been correctly dialled and absorbed but the calling subscriber inadvertently dials a second digit comprising any of the digits 1, 7, 8, 9 or 0, Selector 900 would respond as before and step the wipers to one of these particular corresponding levels. However, none of these levels would affect the normal post springs for absorption, and since the S2 spring contacts 986 would not place ground on the vertical bank contacts corresponding to these digits, relay 905 would not be able to operate when an idle trunk is encountered during rotation of the wipers. Therefore, the wipers would rotate to the eleventh rotary position and return busy tone as before described. Likewise, if the first two digits, such as "23" have been correctly dialled and absorbed, but the calling subscriber inadvertently dials a third digit comprising any of the digits 1, 2, 4, 5, 6 or 0, Selector 900 would respond as before and step the wipers to one of the particular corresponding levels. The S3 springs being operated at this time would not have ground closed to any of these bank contacts on the vertical bank 980, whereby relay 905 would again be unable to operate during the encountering of an idle trunk during rotation of the wipers on any of these particular levels. Had this third digit been the digit "2" the NPS1 springs would close however, the circuit for digit absorbing relay 960 would be opened at S1 spring contacts 971 and would be ineffective to absorb this digit. Thus summarizing the blocking of access to certain levels, levels 3—9 are blocked upon dialling a first digit corresponding thereto, levels 1 and 7—0 are blocked upon dialling a second digit corresponding thereto following the absorption of a first digit "2," and levels 1, 2, 4—6, and 0 are blocking upon dialling a third digit corresponding thereto following the absorption of the first and second digits "23." This necessitates the dialling of a correct code in order to reach the desired suboffice.

*Release*

During the before-described busy blocking conditions of Selector 900, relays 920 and 930 and the cam springs would be operated and either the S1, S2, or the S3 springs will be closed dependent on how many correct digits have already been dialled. In any case, upon the termination of a call or upon receipt of the busy tone, the calling subscriber will hang up his receiver to open the loop circuit. Relay 920 restores opening the circuit to relay 930. After a short duration slow-to-release relay 930 restores. Contacts 931 open to restore the preceding held equipment. Contacts 935 open ground to the vertical bank 980. Contacts 934 close circuits to release magnet 919 and motor magnet 990; the first circuit extending from ground, contacts 917, 922, 934, 947, winding of release magnet 919 to battery; and the second circuit including contacts 963, 959, 991, winding of motor magnet 990 to battery. Motor magnet 990, by means of its self-interrupter contacts 991, will step until the first cam is rotated to the position where the S1 springs are closed (this being the normal position as shown in FIG. 9). Release magnet 919 energizes to restore the wipers to normal, restoring the VON springs, the cam springs, the RON springs, and the normal post springs (if operated) to normal, deenergizing release magnet 919 in the process. Selector 900 is now at normal.

Assume next the termination of a completed call through Selector 900. Relay 910, being the only relay operated, will restore when the parties hang up to remove holding ground from control wiper 999 in the well-known manner. The restoration of relay 910 closes ground at contacts 917 to the release magnet 919 and a homing circuit to motor magnet 990 over the above traced circuits. Selector 900 will thus restore in a manner described above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a plurality of calling substations, a selector switch of the two motion type, a repeater linked incoming to said selector switch, said repeater capable of being seized over either one of two separate incoming paths, a combination first and second selector switch having access to said repeater over said one path from a first of said calling substations, a third selector switch having access to said repeater over said second path from a second of said calling substations, said repeater responsive to being seized over said one path to condition said two-motion selector switch to respond as a combination third and fourth selector, and said repeater responsive to being seized over said second path to condition said two-motion selector switch to respond only as a fourth selector.

2. In a telephone system, a plurality of calling substations, a selector switch of the two motion type, a differential relay in said selector switch, a repeater linked incoming to said selector switch, said repeater having a first and second seizure path over which said repeater is seized, a combination first and second selector switch having access to said repeater over said one seizure path from a first of said calling substations, a third selector switch having access to said repeater over said second path from a second seizure of said substations, said repeater responsive to being seized over said one seizure path thereof to condition said two motion selector switch to respond as a combination third and fourth selector, and said repeater responsive to being seized over said second seizure path thereof to forward ground to operate said differential relay in said two-motion selector switch, means responsive to the operation of said differential relay to condition said two-motion selector switch to respond only as a fourth selector.

3. In a telephone system as claimed in claim 2, including means in said two-motion selector switch responsive to the receipt of a combination of predetermined dialled digits over said one seizure path of said repeater to permit said selector switch to seize a fifth selector, means in said two-motion selector switch responsive to the receipt of a first predetermined dialled digit over said first seizure path of said repeater to permit said two-motion selector switch to seize a fourth selector, and means in said two-motion selector switch responsive to the receipt of one of any of a plurality of predetermined dialled digits over said second seizure path of said repeater to permit said two-motion selector switch to seize a fifth selector.

4. In a telephone system as claimed in claim 3, including blocking means in said two-motion selector switch to prevent seizure of a succeeding selector switch responsive to any non-predetermined dialled digits received over said first or second seizure path of said repeater.

5. In a telephone system, a plurality of calling substations, selector switches of the two motion type, a differential relay in each of said selector switches, repeaters linked incoming to said selector switches, said repeaters each having separate incoming first and second seizure paths over which said repeaters are seized, combination first and second selector switches having access to said repeaters over said first seizure paths by a first of said calling substations, third selector switches having access to said repeaters over said second seizure paths by a second of said substations, said repeaters responsive to being seized over said first seizure paths to forward ground to operate said differential relay to condition said two-motion selector switches to respond as combination third and fourth selectors, and said repeaters responsive to being seized over said second seizure paths by said third selector switches to condition said two-motion selector switches to respond only as fourth selectors.

6. In a telephone system, a calling substation, a selector switch, a repeater linked incoming to said selector switch, said repeater having two separate incoming seizure paths over which said repeater is seized, trunks accessible from every level of said selector switch, a differential relay in said selector switch, means for extending a loop circuit from said calling substation to said repeater over one of said paths, means for extending a loop circuit from said calling substation to said repeater over a second of said paths, means effective responsive to the extension of said loop circuit over said one path for operating said differential relay, and means responsive to the operation of said differential relay for blocking access to levels corresponding to a first plurality of first dialed digits received by said selector switch, and means responsive to the extension of said loop circuit over said second path for blocking access to levels corresponding to a second plurality of first dialed digits received by said selector switch.

7. In a telephone system, a calling substation, a secondary selector switch, a repeater linked to said selector switch, said repeater having two separate incoming seizure paths over which said repeater is seized, trunks accessible from every level of said selector switch, means for extending a circuit from said calling substation to said repeater over one of said seizure paths, means for extending a circuit from said calling substation to said repeater over a second of said seizure paths, means in said linked selector switch effective responsive to the extension of said circuit to said repeater over said one seizure path to block access to levels corresponding to a first plurality of predetermined first dialed digits, and means in said selector switch effective responsive to the extension of said circuit to said repeater over said second seizure path to block access to levels corresponding to a second plurality of predetermined first dialed digits, means in said selector switch effective responsive to the extension of said circuit to said repeater over said one seizure path to permit seizure of a succeeding trunk upon receipt of any one of said second plurality of predetermined first dialed digits, and said last means effective responsive to the extension of said circuit to said repeater over said second seizure path to permit seizure of a succeeding trunk upon receipt of any one of said first plurality of predetermined first dialed digits.

8. In a telephone system, a calling substation, a numerical switch of the two-motion type; said switch comprising a plurality of sets of cam operated springs including one set normally operated, an auxiliary wiper and vertical bank, and a test relay; each set of cam operated springs when operated controlling the connection of ground to different bank contacts on said vertical bank; means for sequentially operating different sets of said cam operated springs upon absorption of dialled digits responsive to the receipt of a sequence of predetermined dialled digits from said calling substation, means responsive only to the operation of said test relay for initiating the cut-through to a succeeding switch, first circuit means permitting operation of said test relay upon said auxiliary wiper engaging a grounded contact on said vertical bank responsive to the receipt of a first predetermined dialled digit, other circuit means permitting operation of said test relay upon said auxiliary wiper engaging a ground contact on said vertical bank responsive to the receipt of a first combination of a plurality of different predetermined dialled digits, and further circuit means permitting operation of said test relay upon said auxiliary wiper engaging a grounded contact on said vertical bank responsive to the receipt of a greater plurality of predetermined dialled digits.

9. In a telephone system as claimed in claim 8, including means responsive to the receipt of a non-predetermined digit for preventing the operation of said test relay.

10. In a telephone system, a calling substation, a numerical switch of the two-motion type; a plurality of sets of cam operated springs including one set normally operated, wipers including a vertical wiper and a vertical bank, a digit absorbing relay, and a test relay in said switch; each set of cam operated springs when operated controlling ground connections to different bank contacts on said vertical bank, a first set of normal post springs associated with said one normally operated set of cam operated springs, a second set of normal post springs associated with a second of said sets of said cam springs, means for sequentially operating a succeeding set of cam springs responsive to the absorption of a dialled digit, circuit means for operating said digit absorbing relay upon said first set of normal post springs and said one normally operated set of cam springs being operated at the same time said first set of normal post springs operative responsive to the receipt of a first predetermined dialled digit from said calling substation for absorption thereof, other circuit means for operating said digit absorbing relay upon said second set of normal post springs and the second set of cam springs being operated at the same time said second set of normal post springs operative responsive to the receipt of a second predetermined dialled digit from said calling substation for absorption thereof, and further circuit means permitting operation of said test relay upon receipt of a third predetermined dialled digit corresponding to a bank contact grounded by a third set of said cam operated springs.

11. In a telephone system as claimed in claim 10, including means for blocking access to levels corresponding to certain dialled digits other than said sequential first, second and third predetermined dialled digits to initiate the return of busy tone to said calling substation.

12. In a telephone system, a calling substation, a numerical switch of the two-motion type; a plurality of sets of cam operated springs including one set normally operated, normal post springs, wipers, an auxiliary wiper and a vertical bank, and a test relay in said switch; means for extending a loop circuit from said substation to said switch, each set of cam operated springs when operated controlling ground connections to different predetermined bank contacts on said vertical bank, a digit absorbing relay controlled by a first and second set of said cam operated springs and by a first and second set of said normal post springs, means responsive only to said vertical wiper engaging a grounded bank contact on said vertical bank for permitting the operation of said test relay to initiate the cut-through of said switch to a succeeding switch, means responsive to the operation of said first set of normal post springs in conjunction with said one normally operated set of cam operated springs to operate said digit absorbing relay in response to the receipt of a first predetermined dialled digit from said calling substation to initiate the absorption thereof, means responsive to the absorption of a first dialled digit for operating a second set of said cam operated springs and restoring said first normally operated cam operated springs, means responsive to the operation of said second set of normal post springs in conjunction with said second set of operated cam operated springs to operate said digit absorbing relay in response to the receipt of a second predetermined dialled digit from said calling substation to initiate the absorption thereof, means responsive to the absorption of a second dialled digit for operating a third set of said cam operated springs and restoring said second set of cam springs, and means responsive to any predetermined dialled third digit corresponding in numerical value to the grounded bank contacts controlled by said third set of cam operated springs to permit operation of said test relay.

13. In a telephone system as claimed in claim 12, including blocking means comprising said cam operated springs and said vertical bank for initiating the return of busy tone to the calling substation if an incorrect sequence of first second or third dialled digits are received from said calling substation.

14. In a two-motion switch having wipers accessible to trunk lines terminating in bank contacts arranged in levels, said levels corresponding in number to the decimal digits 1 to 0, inclusive, a first plurality of trunk line groups each having a different predetermined single digit designation and each said first trunk group terminating in the level corresponding respectively to its predetermined single digit designation, a second plurality of trunk line groups each having a bi-digit designation and each second trunk group terminating in the level corresponding respectively to its predetermined ultimate digit in its bi-digit designation, the remaining plurality of said trunk line groups each having a tri-digit designation and each said remaining trunk group terminating in the level corresponding respectively to its predetermined ultimate digit in its tri-digit designation; each said predetermined single digit in said single digit designation and each said predetermined ultimate digit, in said bi-digit designation and in said tri-digit designations being a different digit, switch control means for operating said wipers to select respective ones of said first trunk group levels and an idle trunk in the selected level in response to the receipt of first digits corresponding to any one of said predetermined single digit designations, switch releasing means for releasing said wipers from a level after operation thereto by said switch control means in response to the receipt of a certain first digit, blocking means comprising an auxiliary wiper having access to an auxiliary set of bank contacts and cooperating with a series of cam operated springs over circuits interconnecting said contacts and said springs for blocking connections to any trunk line in said second and said remaining trunk group levels in response to the receipt of first digits other than said certain first digit and said first digits corresponding to said predetermined single digit designations, said switch control means effective after operation of said releasing means for reoperating said wipers to select respective ones of said levels in said second trunk group levels and an idle trunk in said selected levels in response to the receipt of second predetermined digits corresponding to said ultimate digits in said bi-digit designations, said switch releasing means effective for releasing said wipers from a level after operation thereto by the second operation of said switch control means in response to the receipt of a second certain digit, said blocking means blocking connections to any trunk line in said first and said remaining trunk groups in response to the receipt of second digits other than said second certain digit and second digits corresponding to said ultimate predetermined digits in said bi-digit designations, said switch control means effective after said second releasing operation for again reoperating said wipers to select respective ones of said levels in said remaining trunk groups and an idle trunk in the selected levels in response to the receipt of digits corresponding to said predetermined ultimate digits in said tri-digit designations, and said blocking means blocking connections to any trunk line in said first and second trunk groups in response to the receipt of third digits other than said ultimate predetermined digits in said tri-digit designations.

15. In a telephone system, a repeater having a first incoming seizure path, a second incoming seizure path, and an outgoing path; a switch connected to said repeater over said outgoing path, a group of trunk lines terminating in said switch, wipers in said switch having access to said trunk lines, directive means in said switch controlled over said outgoing path from said repeater for operating said wipers in a primary movement to select said group of trunk lines, selecting means in said switch effective after a primary movement of said wipers for operating said wipers to select and connect with an idle one of said trunk lines in said selected trunk group, means jointly controlled by said repeater and said switch for enabling said selecting means to seize and connect with an idle one of said trunk lines in said selected trunk group only in case said repeater is seized over said first incoming path, and disabling means in said switch for preventing the seizure of an idle trunk line in said selected trunk group by said selecting means in case said repeater is seized over said second incoming path.

16. In a telephone system, a repeater having a first incoming seizure path, a second incoming seizure path, and an outgoing path; a switch connected to said repeater over said outgoing path, a group of trunk lines terminating in said switch, wipers in said switch having access to said trunk lines, directive means in said switch controlled over said outgoing path from said repeater for operating said wipers in a primary movement to select said group of trunk lines, selecting means in said switch effective after a primary movement of said wipers for operating said wipers to select and connect with an idle one of said trunk lines in said selected trunk group, means in said repeater for transmitting the impulses of one or more digits over said outgoing path to operate said directive means to cause said wipers to select said trunk group, means in said switch responsive to the receipt of only a first of said transmitted digits for operating both said directive means and said selecting means to cause said wipers to seize and connect with an idle trunk line in said selected trunk group in case said repeater is seized over said second incoming path, and means jointly controlled by said repeater and said switch for operating both said directive means and said selecting means to cause said wipers to seize and connect with an idle line in said selected trunk group only in response to the receipt of both a first and second of said transmitted digits in case said repeater is seized over said first incoming path.

17. A telephone system as claimed in claim 16, including disabling means in said switch for preventing the seizure of an idle trunk line in said selected trunk group by said selecting means, said disabling means effective in response to the receipt of the first transmitted digit in case said repeater is seized over said first incoming path.

18. In a telephone system, a repeater having a first incoming seizure path, a second incoming seizure path, and an outgoing path, a switch connected to said repeater over said outgoing path, a first and a second group of trunk lines terminating in said switch, wipers in said switch having access to said trunk lines, directive means in said switch controlled over said outgoing path from said repeater for operating said wipers in a primary movement to select either one of said trunk groups, selecting means in said switch effective after a primary movement of said wipers for operating said wipers to select and connect with an idle one of said trunk lines in the selected trunk group, means in said repeater for transmitting the impulses of one or more digits over said outgoing path to operate said directive means to cause said wipers to select one of said trunk groups, means jointly controlled by said repeater and said switch in response to the receipt of a predetermined first digit or predetermined first and second digits transmitted from said repeater over said outgoing path for controlling both said directive means and said selecting means to cause said wipers to select and connect with an idle trunk in said selected trunk group, disabling means in said switch effective to control said selecting means to prevent the seizure of an idle trunk in said first trunk group in case said repeater is seized over said second incoming seizure path, and said disabling means effective to control said selecting means to prevent the seizure of an idle trunk line in said second trunk group in response to the receipt of a first of said transmitted digits in case said repeater is seized over said first incoming seizure path.

19. In a telephone system, a repeater having a first incoming seizure path, a second incoming seizure path, and an outgoing path, a switch connected to said repeater over said outgoing path, a first and a second group of trunk lines terminating in said switch, wipers in said switch having access to said trunk lines, directive means in said switch controlled over said outgoing path from said repeater for operating said wipers in a primary movement to select either one of said trunk groups, selecting means in said switch effective after a primary movement of said wipers for operating said wipers to select and connect with an idle one of said trunk lines in the selected trunk group, means in said repeater for transmitting the impulses of one or more digits over said outgoing path to operate said directive means to cause said wipers to select one of said trunk groups, means jointly controlled by said repeater and said switch in response to the receipt of a predetermined first digit or predetermined first and second digits transmitted from said repeater over said outgoing path for controlling both said directive means and said selecting means to cause said wipers to select and connect with an idle trunk in said selected trunk group, means jointly controlled by said repeater and said switch effective to control said selecting means to cause the seizure of an idle trunk line in said second trunk group in response to the receipt of a second transmitted digit following a predetermined first transmitted digit in case said repeater is seized over said first incoming seizure path, and disabling means in said switch effective to disable said selecting means in response to the receipt of a first transmitted digit other than said predetermined first digit in case said repeater is seized over said first incoming seizure path.

20. In a telephone system as claimed in claim 19 including releasing means in said switch effective to release said wipers after a first directive primary movement in case said first directive primary movement is responsive to the receipt of said predetermined first transmitted digit.

21. In a telephone system as claimed in claim 19, wherein said selecting means is effective in response to the receipt of a first transmitted digit over said outgoing path to cause said wipers to seize an idle trunk line in said second trunk group in case said repeater is seized over said second incoming seizure path.

22. In a telephone system, a repeater having a first incoming seizure path, a second incoming seizure path, and an outgoing path, a switch connected to said repeater over said outgoing path, a first and a second group of trunk lines terminating in said switch, wipers in said switch having access to said trunk lines, directive means in said switch controlled over said outgoing path from said repeater for operating said wipers in a primary movement to select either one of said trunk groups, selecting means in said switch effective after a primary movement of said wipers for operating said wipers to select and connect with an idle one of said trunk lines in the selected trunk group, means in said repeater for transmitting the impulses of one or more digits over said outgoing path to operate said directive means to cause said wipers to select one of said trunk groups, means jointly controlled by said repeater and said switch in response to the receipt of a predetermined first digit or predetermined first and second digits transmitted from said repeater over said outgoing path for controlling both said directive means and said selecting means to cause said wipers to select and connect with an idle trunk in said selected trunk group, means jointly controlled by said repeater and said switch effective to control said selecting means to cause the seizure of an idle trunk line in said first trunk group in response to the receipt of a first transmitted digit in case said repeater is seized over said first incoming seizure path and to cause the seizure of an idle trunk line in said second trunk group in response to the receipt of a second transmitted digit following a predetermined first transmitted digit in case said repeater is seized over said first incoming seizure path, and means in said switch effective to control said selecting means to cause seizure of an idle trunk line in said second trunk group in response to the receipt of a first transmitted digit in case said repeater is seized over said second incoming seizure path.

23. In a telephone system as claimed in claim 22 including disabling means in said switch for disabling said selecting means to prevent said wipers seizing and connecting with an idle trunk line, said disabling effective to prevent connections to idle trunk lines in said first trunk group in response to a second transmitted digit following the transmission of a predetermined first transmitted digit in case said repeater is seized over said first incoming seizure path and effective to prevent connections to idle trunk lines in said second trunk group in response to a first transmitted digit in case said repeater is seized over said first incoming seizure path, said disabling means effective to prevent connections to idle trunk lines in said first trunk group in case said repeater is seized over said second incoming seizure path and effective to prevent connections to idle trunks in said second trunk group in response to a second transmitted digit following the receipt of said predetermined first transmitted digit in case said repeater is seized over said second incoming seizure path.

24. In a telephone system as claimed in claim 23 including releasing means in said switch effective to release said wipers after a first directive primary movement in case said first directive primary movement is responsive to the receipt of said predetermined first transmitted digit.

25. In a telephone system, a repeater having a first and a second incoming seizure path and an outgoing path, a two-motion selector switch connected to said repeater over said outgoing path, first groups of trunk lines having predetermined single digit designations terminating in said switch, other groups of trunk lines having predetermined plural digit designations terminating in said switch, wipers in said switch having access to said trunk lines, directive means in said switch for directively operating said wipers in a primary movement to select any one of said groups of trunk lines, selecting means in said switch normally effective after a primary movement of said wipers for operating said wipers in a secondary movement to automatically select an idle trunk line of the selected group, means in said repeater for transmitting the impulses of one or more digits over said outgoing path to operate said directive means and cause said wipers to select the one of said trunk groups corresponding to the number of impulses in said transmitted digit or digits, first means operative in case said repeater is seized over said first incoming seizure path and then only in case the first of said transmitted digits corresponds to a trunk line having a single digit designation for operating said selecting means to cause said wipers to select an idle trunk line in the selected one of said first trunk groups, releasing means in said switch for releasing said wipers after a first directive primary movement, other means operative in case said repeater is seized over said second incoming seizure path and then only in case the first of said transmitted digits corresponds to a predetermined digit for disabling said selecting means and for operating said releasing means to restore said wipers from their first operated primary movement, and further means operative after operation of said releasing means only in case the second of said transmitted digits corresponds to a trunk line having a plural digit designation for operating said selecting means after a second directive primary movement to cause said wipers to select an idle trunk line in the selected one of said second trunk groups.

26. In a telephone system, a repeater having a first incoming seizure path, a second incoming seizure path and an outgoing path, a switch connected to said repeater over said outgoing path, a first and a second group of trunk lines terminating in said switch, wipers in said switch having access to said trunk lines, means in said repeater for transmitting the impulses of one or more digits over said outgoing path to said switch, means whereby said trunk lines in said first trunk group are seizable by said wipers in response to the receipt of a first predetermined digit transmitted by said repeater over said outgoing path in case said repeater is seized over said first incoming seizure path and are non-seizable by said wipers in case said repeater is seized over said second incoming seizure path, and means whereby said trunk lines in said second trunk group are seizable by said wipers in response to the receipt of a first different predetermined digit transmitted by said repeater over said outgoing path in case said repeater is seized over said second incoming seizure path and are seizable in response to the receipt of a first further different predetermined digit followed by the receipt of a second digit corresponding to said first different predetermined digit and transmitted by said repeater over said outgoing path in case said repeater is seized over said first incoming seizure path.

27. In a telephone system as claimed in claim 26, including disabling means in said switch controlled by the incoming path over which said repeater is seized and effective to prevent said wipers seizing said trunk lines in case improper first and second digits, other than said predetermined digits, are transmitted by said repeater over said outgoing path.

References Cited in the file of this patent

UNITED STATES PATENTS

| | | |
|---|---|---|
| 1,934,737 | Richardson | Nov. 14, 1933 |
| 2,691,066 | Fisher | Oct. 5, 1954 |
| 2,847,510 | Gatzert | Aug. 12, 1958 |
| 2,892,893 | Paris | June 30, 1959 |